United States Patent
Fogelson

(10) Patent No.: US 7,254,553 B2
(45) Date of Patent: *Aug. 7, 2007

(54) BUILDERS ON-LINE ASSISTANT

(76) Inventor: Bruce A. Fogelson, 1145 W. Montana, Chicago, IL (US) 60614

( * ) Notice: Subject to any disclaimer, the term of this patent is extended or adjusted under 35 U.S.C. 154(b) by 851 days.

This patent is subject to a terminal disclaimer.

(21) Appl. No.: 09/768,476

(22) Filed: Jan. 24, 2001

(65) Prior Publication Data

US 2002/0099617 A1 Jul. 25, 2002

Related U.S. Application Data

(63) Continuation-in-part of application No. 09/483,579, filed on Jan. 14, 2000, now Pat. No. 7,076,455.

(51) Int. Cl.
*G06F 17/30* (2006.01)
(52) U.S. Cl. .......................... 705/27; 705/26
(58) Field of Classification Search ............... None
See application file for complete search history.

(56) References Cited

U.S. PATENT DOCUMENTS

| | | | | |
|---|---|---|---|---|
| 5,111,392 A | * | 5/1992 | Malin | 705/29 |
| 5,689,705 A | * | 11/1997 | Fino et al. | 707/201 |
| 5,825,881 A | * | 10/1998 | Colvin, Sr. | 705/78 |
| 5,991,769 A | * | 11/1999 | Fino et al. | 345/619 |
| 6,052,669 A | * | 4/2000 | Smith et al. | 705/26 |
| 6,321,202 B1 | * | 11/2001 | Raveis, Jr. | 705/1 |
| 6,345,258 B1 | * | 2/2002 | Pickens | 705/1 |
| 6,393,410 B1 | * | 5/2002 | Thompson | 705/37 |
| 6,539,401 B1 | * | 3/2003 | Fino et al. | 707/201 |
| 6,594,633 B1 | * | 7/2003 | Broerman | 705/1 |
| 7,006,977 B1 | * | 2/2006 | Attra et al. | 705/1 |
| 2001/0032062 A1 | * | 10/2001 | Plaskoff et al. | 703/1 |
| 2001/0044768 A1 | * | 11/2001 | Wares | 705/37 |
| 2002/0046044 A1 | * | 4/2002 | Johnston et al. | 705/1 |
| 2002/0052755 A1 | * | 5/2002 | Whatley et al. | 705/1 |
| 2002/0065739 A1 | * | 5/2002 | Florance et al. | 705/26 |
| 2002/0077928 A1 | * | 6/2002 | O'Brien | 705/26 |
| 2002/0087332 A1 | * | 7/2002 | Como | 705/1 |
| 2002/0087705 A1 | * | 7/2002 | Smyth | 709/229 |
| 2003/0009349 A1 | * | 1/2003 | Shu | 705/1 |
| 2003/0036963 A1 | * | 2/2003 | Jacobson et al. | 705/26 |
| 2003/0101127 A1 | * | 5/2003 | Cornelius | 705/37 |
| 2005/0149410 A1 | * | 7/2005 | Livesay | 705/26 |
| 2006/0031159 A1 | * | 2/2006 | Minot et al. | 705/38 |

OTHER PUBLICATIONS

"Great American Virtual Home", Professional Builder, 1993, v61, n1.*

(Continued)

*Primary Examiner*—Steven B. McAllister
(74) *Attorney, Agent, or Firm*—Welsh & Katz, Ltd.

(57) ABSTRACT

A method and apparatus are provided for servicing a customer of a builder by a third-party website provider. The method includes the steps of providing a first website by the third-party website provider for use by the customer in viewing and selecting product options for product offerings provided by the builder, receiving from the customer through the first website views and selections of an option of the options provided by the builder and collecting a fee or commission based upon the received selection made by the customer.

26 Claims, 31 Drawing Sheets

OTHER PUBLICATIONS

"Growth Spurt (Wexford Homes)", Builder, 1997, v. 20, n. 2.*
Buchanan, Leigh, "Seeing the Sites", Inc., 1997, v. 19, n. 15.*
John Murtagh (Longford Homes of Nevada President builder's Spotlight), Builder, 1995, v. 18, n. 1.*
McKee, Jamie, "Former coleman Executive to Open Experimental Home Development", Las Vegas Business Press, 1992, v. 9, n. 4.*
Farnsworth, Christina, "Taking Care of Business—on the Internet", Professional Builder, 1993, v. 60, n. 16.*
Campos, Frellie, "Potential buyers Can Stay Home to House Hunt", Pacific Business News, 1997, v. 34, n. 52.*
Longford Homes Website Printout, www.longfordhomes.com.*
"RFP Marketing Opportunities Abound at 'Design Your Dream House' Site", Internet World, Aug. 15, 1999.*
Realtor.com website, Mar. 2, 2000.*
"RFP Marketing Opportunities Abound at 'Design Your Dream House' site", Internet World, Aug. 15, 1999.*
New Internet-Based Service Company Streamlines Selection Process for Residential Building Industry; Business Wire; May 4, 2000.*
Home Portfolio Lets Shoppers Get Personal; Business Wire; Apr. 17, 1998.*
Harmony Home Consultants Establishes Web Site; PR Newswire; Jul. 31, 2000.*

* cited by examiner

FIG. 6

PURCHASE OFFER

- 124 — MODEL #
- 126 — SELECTED OPTIONS
- 128 — SELECTED LOT
- 130 — TOTAL PRICE

132 — BUYER'S INFOMATION
- NAME: — 142
- ADDRESS: — 144
- PHONE #: — 146
- CREDIT REF: — 148
- 150 — E-MAIL ADDR:     CF # — 152

- 134 — DEPOSIT REQUIRED     $ XXXXX.XX
- 135 — COMPLETION DATE     M/Y/D

136 — HOW WILL YOU SUBMIT DEPOSIT?
- CREDIT CARD NO.
- CHECK

- 138 — PRINT PURCHASE OFFER
- SUBMIT PURCHASE OFFER — 140

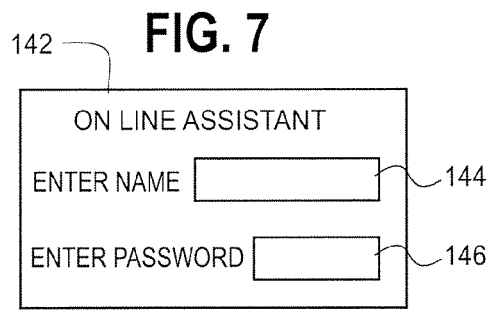
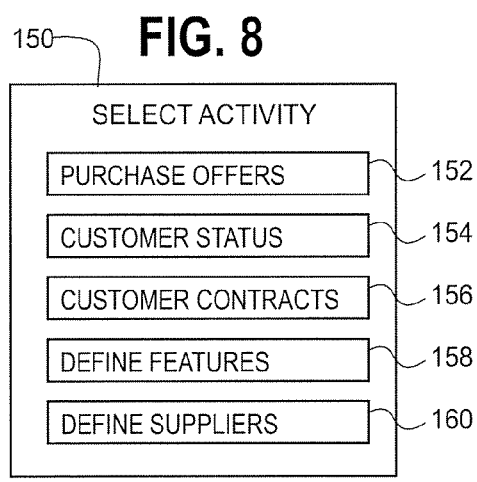
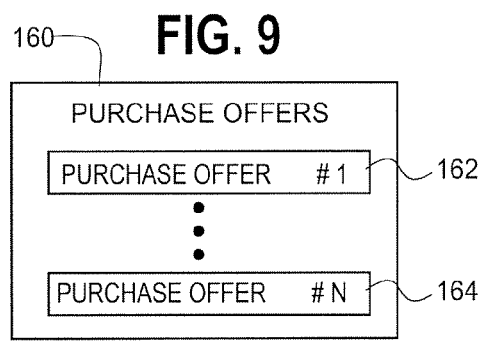
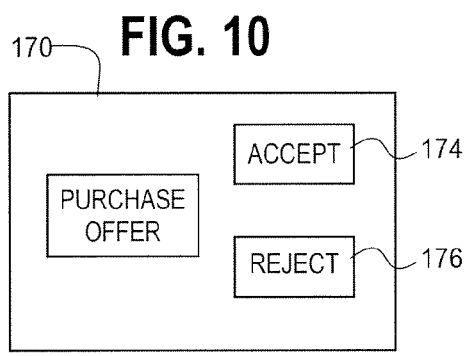
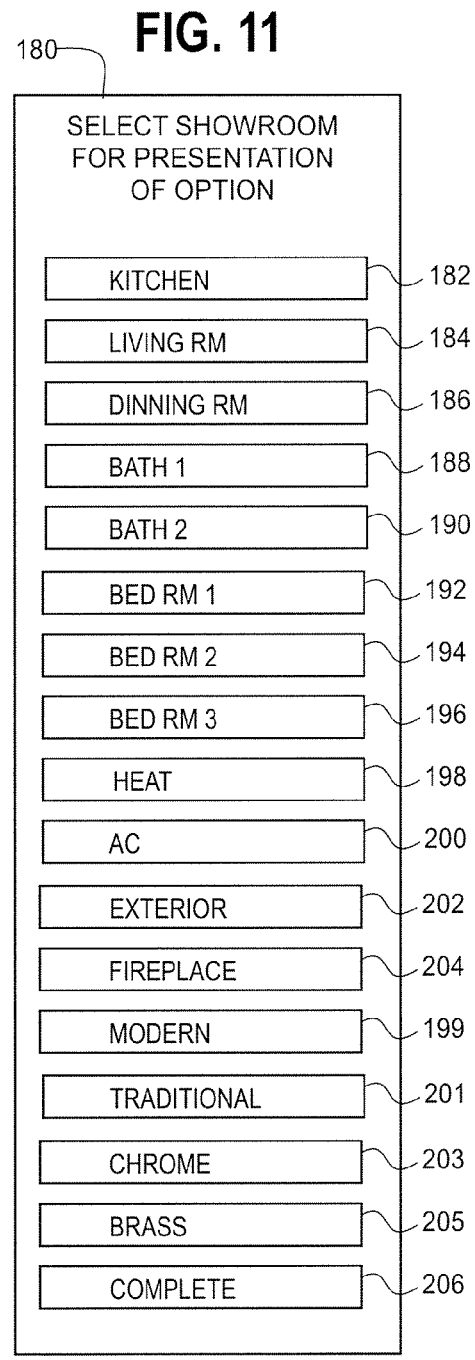

FIG. 18
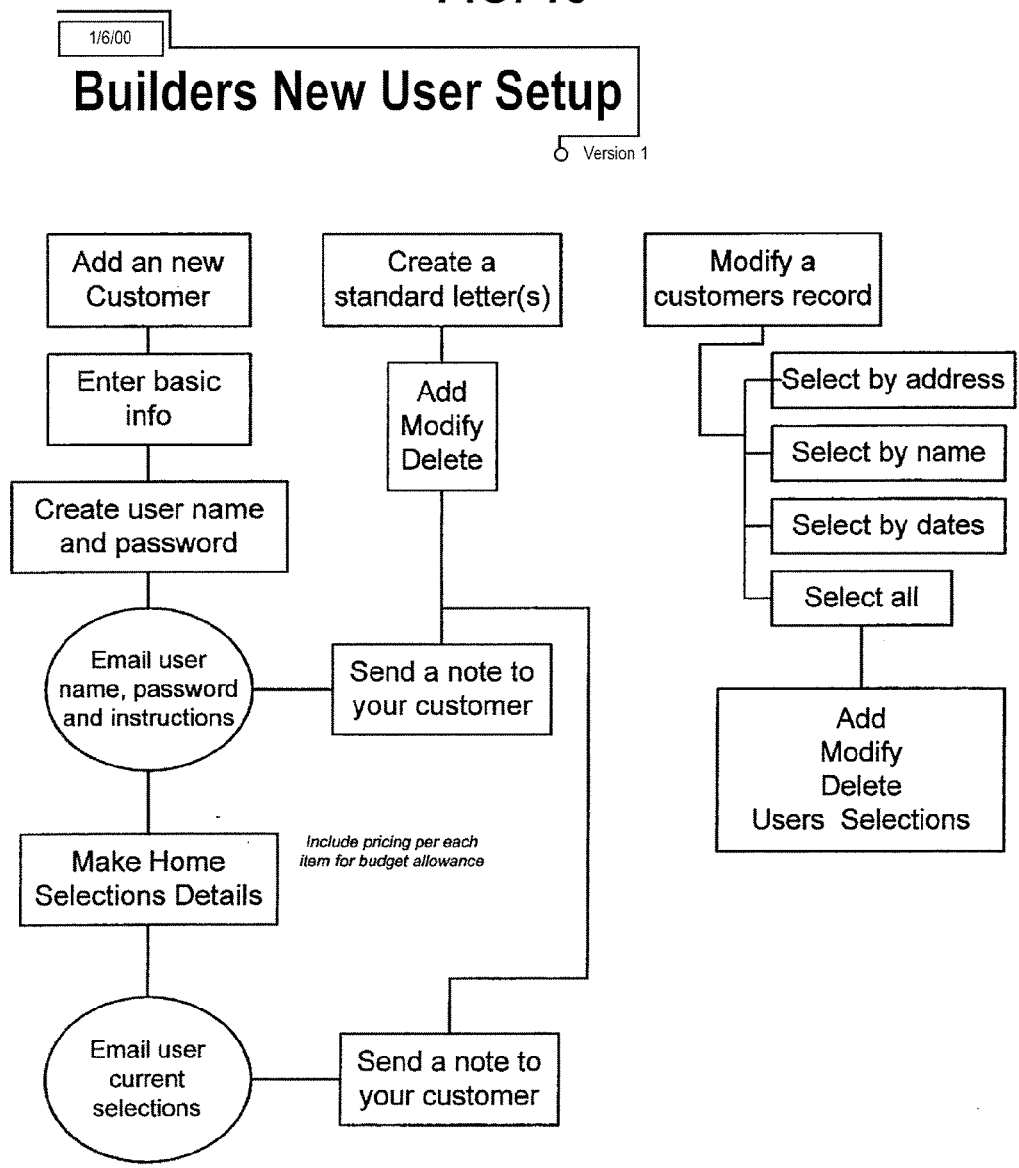
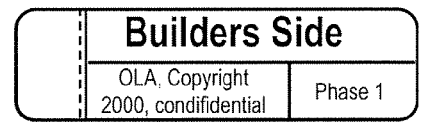

FIG. 21
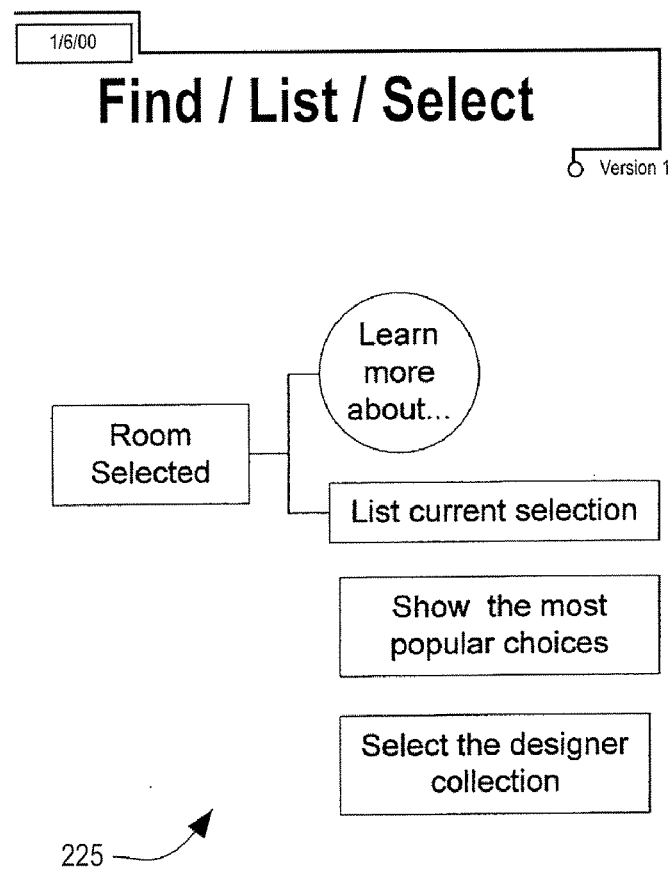
225
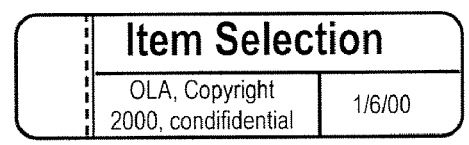

Kitchen Item Selection

Home | Help | Send note to builder | See selections needed to be made | See selections need by date

FIG. 27

Kitchen Item Selection

Home | Help | Send note to builder | See selections needed to be made | See selections need by date Style    Design    Price    Material    Color County    Any    Standard    Any    White    — 324    Search Kitchen
Dining — Appliance, Stove, Refrigerator, Dishwasher, Sink
Den — Counter Top
Living
Bed — Cabinets, Base Cab, Wall Cab
Bath — Flooring, Wall Covering

— 320

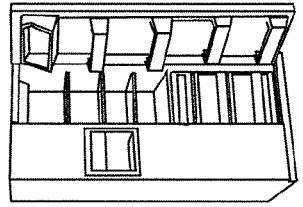

TPX24PPBWW - GE PROfile Performance™ 23.5 Cu. Ft. Custom Style™ Side-By-Side Refrigerator with Dispenser See More Info — 322
Add to my Cart — 326

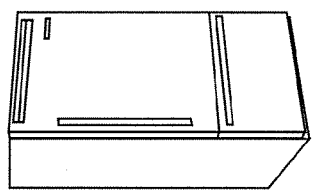

The VCBB Built-in, 36" wide.Bottom-mount Refrigerator/Freezer

See More Info
Add to my Cart

Sub-Zero
See more info — 328

FIG. 28

Kitchen Item Selection

Home | Help | Send note to builder | See selections needed to be made | See selections needed to be made | See selections need by date

| Kitchen | Appliance |
|---|---|
| Dining | Stove |
| | Refrigerator |
| Den | Dishwasher |
| | Sink |
| Living | Counter Top |
| Bed | Cabinets |
| | Base Cab |
| | Wall Cab |
| Bath | Flooring |
| | Wall Covering |

Style  Design  Price  Material  Color
County  Any  Standard  Any  White  Search

342 ⬈    344 ⬈    346 ⬈    332 ⬈

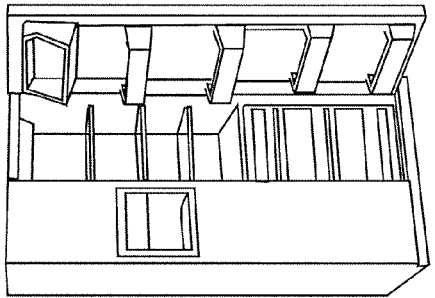

TPX24PPBWW - GE Profile Performance™ 23.5 Cu. Ft. CustomStyle™ Side-By-Side Refrigerator with Dispenser ⟶ 330

- Trimless Model
- 23.5 cu ft (Fresh Food 14.48 cu ft / Freezer 9.05 cu ft)
- Exclusive Water by Culligan™ Provides Cleaner, Better Tasting Water and Ice through the LightTouch! Dispenser (Chilled Water, Cubed and Crushed Ice)
- Smart Storage System (1 Adjustable Humidity Crisper, 1 Convertible Meat Keeper with Cold Control and 1 Adjustable Humidity Snack Pan)
- 3 Adjustable Glass Fresh Food Cabinet Shelves (2 Slide Out, Spill Proof)
- Quick Space™ Shelf
- Adjustable Modular Gallon Door Bins Add to my Cart ⬅ 326

FIG. 34
Kitchen
Counter
Cabinet
Floor
Current Selections
Home | Help | Send note to builder | See selections needed to be made | See selections need by date
| Item | Desc | Options | Budget Price | Net Price Chg. | |
|------|------|---------|--------------|----------------|---|
| Counter | Rossetta | Upgrade1 | $1,000 $1200 | $200 Extra |  |
| Cabinet | Dixie | Standard | $ Include | $ Included | 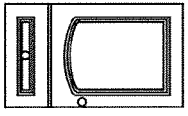 |
| Floor | Cherry | Standard | $ Include | $ Included | 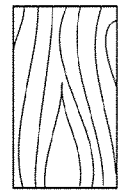 |

BUILDERS ON-LINE ASSISTANT

CROSS REFERENCE TO RELATED APPLICATIONS

The present application is a continuation-in-part application of U.S. patent application Ser. No. 09/483,579, entitled BUILDERS ON-LINE ASSISTANT, filed on Jan. 14, 2000 now U.S. Pat. No. 7,076,455.

BACKGROUND OF THE INVENTION

The invention relates to the construction industry and more particularly to methods of coordinating, displaying, processing and expediting selection processes of building options. The home-building business is used as a primary illustration, but this invention also applies to commercial, office, and other construction and renovation. Architects, designers, and renovators may find this invention useful, in addition to builders.

Construction is a very detail-oriented industry. Often a buyer or end-user (henceforth collectively referred to as "customer") and seller, builder, installer, or general contractor (henceforth collectively referred to as "builder") will meet many times to explore, select and negotiate overall scope and terms of a construction project. Often the only basis that a builder may have for quoting a price is a vague list or set of architectural drawings (layouts) and a general "sense" of what customers desire. In such cases, the builder may estimate the cost of "fitting out" a building based upon past experience or upon local trade craft for "typical" or "standards".

In the case of residential construction, a myriad of standard or above standard choices faces the customer once a contract has been signed. Often a builder will provide a number of options with regard to overall house design and functionality. Some options may relate to room and/or kitchen layout. A number of mechanical/system options, such as heating and cooling, may also be provided. Changes to a plan's electrical and plumbing systems, basement (either finished or unfinished), or garages may be available. Each option (or package of options) usually has its own advantages and disadvantages that may appeal to one customer over another.

Once the overall layout and functionality of a house is complete, the selection process may become even more involved. Design preferences such as floor coverings must be selected, kitchen and bathroom designs must be finalized. The customer must decide what color to paint the walls or whether wallpaper is a better choice.

The finalization of kitchen design is an especially complex process of integrating the various parts of design, products and "hook-up" of water, mechanical systesm, electric services, and other systems. Kitchen cabinets must be selected from any of a number of confusingly similar quantity, quality and feature options. Countertops, sinks and faucets must be coordinated to fit and function. Provision must be made for built-in appliances. Water, sewer and electric connections must be considered for each option. After cabinets have been selected, appliances may be ordered to conform to the overall design, or visa versa.

Bathroom choices are equally complex. Fixtures such as sinks, toilets, tubs and faucets must be selected. If the bathroom is to be tiled, then a type and color(s) must be selected to conform to the other choices.

Usually a builder provides an allowance for each option. The cheapest (or most popular) option may be included in the overall construction price. Where another option is selected, the customer may incur an additional charge or receive credit against the construction price, which must be included in calculations regarding credit, product installations and profit. The cost of labor expended in making design changes and installing options is another variable builders consider when pricing materials and substitutions, or offering credits.

While builders and customers may painstakingly track the customer selection process, the process requires countless hours spent presenting options and recording customer choices. Additional time is wasted relaying these various, interrelated choices to sub-contractors, vendors, distributors, manufacturers, purchasing managers, and job site personnel (henceforth collectively referred to as "trades"). Further, no true "retail" outlet exists for these options, essentially sub-trade industry products (i.e., faucets are available at plumbing supply showrooms, doors and trim at lumber yards, appliances at appliance stores). New construction products frequently vary from similar renovation products. Likewise, varied industry and non-trade pricing and discounts apply to these industry products.

Where the customer and builder have busy schedules, choices are often not made in a timely manner. Further, the Statute of Frauds requires a written note or memorandum (e.g., a signed contract, change order, etc.). Accordingly, a need exists for a means of facilitating the presentation and documentation process of products, services and processes of the construction industry.

BRIEF SUMMARY OF THE INVENTION

A method and apparatus are provided for servicing a customer of a builder by a third-party website provider The method includes the steps of providing a website by the third-party website provider for use by the customer in selecting product options for product offerings provided by the builder or trades, receiving from the customer through the website a selection of an option of the options provided by the builder or trades and collecting a fee or commission based upon the received selection made by the customer and/or an advertising revenue for the "pass through" of options at such point of purchase.

BRIEF DESCRIPTION OF THE DRAWINGS

FIG. 6 depicts a purchase offer that may be made to a builder using the system of FIG. 1;

FIG. 7 depicts a sign-on screen that may be used by a customer or builder of FIG. 1;

FIG. 8 depicts a screen that may be viewed by a builder using the system of FIG. 1;

FIG. 9 depicts a list of purchase offers that may be viewed by a builder using the system of FIG. 1;

FIG. 10 depicts a particular purchase offer that may be viewed by the builder using the system of FIG. 1;

FIG. 11 depicts a virtual showroom that may be visited by a customer of a builder using the system of FIG. 1;

FIG. 18 depicts a new customer setup screen of the system of FIG. 1;

FIG. 21 depicts an options selection screen of the system of FIG. 1; and

FIG. 23-FIG. 29 depict a series of screens that a customer may view in succession.

FIG. 32-FIG. 34 depict additional selection screens that may be used by a customer of a builder using the system of FIG. 1.

Appendix I is a series of screens that a customer may view in succession.

Figure 1:
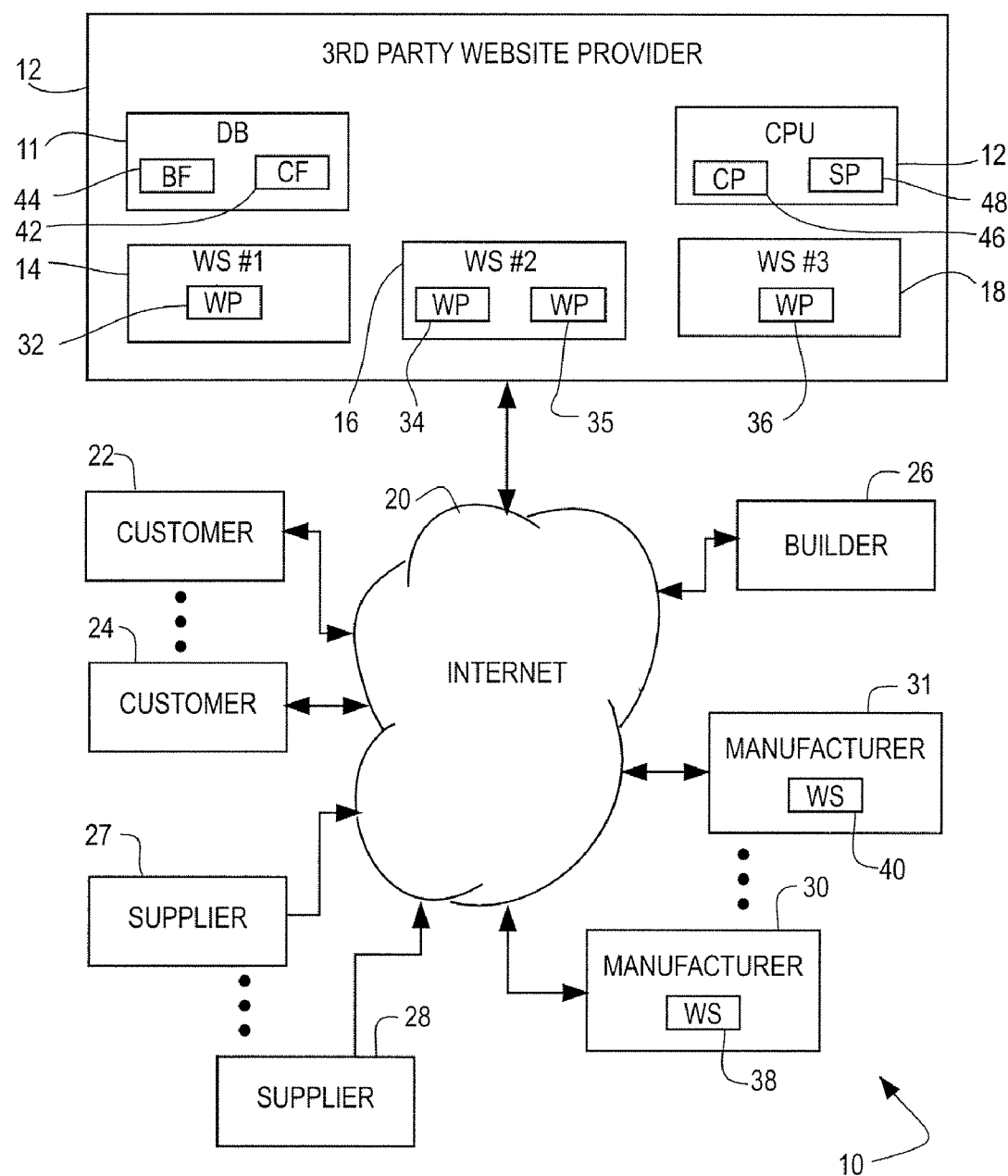
FIG. 1 is a block diagram of a system for servicing a customer of a builder in accordance with an illustrated embodiment of the invention.

Appendix II is a data model flow-chart of the system of FIG. 1.

Appendix III is a series of slides detailing the merits of the system of FIG. 1.

DETAILED DESCRIPTION OF THE INVENTION

The market for the system provided herein is, for example, the over 65,000 builder-members of the Home Builders Association, over 100,000 U.S. builders, the over 1,600,000 new-home starts per year or the millions of re-sale homes which need home improvements. An average new home price of about $200,000 provides a general market volume of over $300,000,000,000. The "secondary" product market of new-home upgrades or selections, referred to as "standards and extras," averages $20,000 per home. Typically, some selections are referred to as standards and offered at no additional cost such as predefined grades of carpet, counter tops, cabinet, and some basic fixture colors. Standards are generally base grade and thus extras become a significant cost to customers and a profit center to builders and trades. These secondary extras often run from 1% to 20% or more of the original house price. This sub-market (at even 10% of the overall market) amounts to $30,000,000,000.

It is not unreasonable to state that one of the most frustrating parts of the buyer/builder/trades relationship is: 1) the standards and extras selection process and 2) the contract, supply, and administration process. Standards are standard options provided at no additional cost by the builder. Extras are at extra cost. The standards and extras selection process has no industry standards. Furthermore, customers, (who feel stressed by the purchase anyway) often feel as though they are a "captive market" to their builder's pricing and selections, since they have no other "market" or source for shopping or comparing.

Likewise, builders (already at the mercy of the trades and having enough difficulty coordinating the overall process of home construction on a fixed schedule) have trouble translating their customer's "dream home" into product, pricing and coordination. This is particularly difficult due to the broadly varied products to select and coordinate deliver from since no "hub" exists from which both builder and customer can both select products. In fact, many products have no retail availability except from trade to builder, or consist of labor-only field changes.

Customers are often restricted to builders' job-site show rooms and sales centers (if any) and builders' sales people. The show rooms and sales centers often have limited product information, limited hours, and offer little assistance in "shopping" outside their builders' showroom. Often customers want to see standard options and extras before signing the home buying contract, which builders view as difficult and a waste of time until the larger contract is executed. This leads them to the builders' selections center, that is often ill-kept and not well "merchandised". Most builders build the selections center as a small part of a temporary sales office located on-site, or simply maintain a library of industry catalogs and brochures.

The contract process can be just as hard on both customer and builder. There is no standard contract (unlike the typical local realtor contracts for existing homes). Customer and builder often rely on lawyers to negotiate both broad and fine points from scratch. Once executed, the complex language in the contracts is normally intimidating rather than serving as a help in instructing the customer on how to proceed toward options selections and closing. Often the contracts are burdened by references to such disasters (e.g., fire, flood, strikes, etc.) as to discourage the customer from executing the contract.

Builder's brochures (or web sites) offer such sales messages to customers as to: 1) the home façade and layout; 2) the location and 3) the builder. However, they do not do much to address the standards/extras product selections or the contract. These are left as subsequent hurdles. Builders spend thousands on sales centers whose primary focus is, again, the home design, layout, façade, lot, room dimensions, the location and the builder. The only other place customers can look at products is a local retailer (e.g., Sears, Best Buy, Home Depot, etc.). However, the local retailer is not focused on sales to the trades and not to the customer-builder relationship. Retail product lines also differ from products used in renovations.

FIG. 1 is a block diagram of a system 12 which substantially addresses these problems. The system 12 may be operated by a third party website provider on one or more central processing units (CPUs) 12 and databases (DBs) 11. Under the illustrated embodiment, one or more interactive websites 14, 16, 18 are provided by the CPU 12 for the benefit of customers 22, 24, builders 26, and suppliers 27, 28 and manufacturers 30, 31 (the trades). The websites 14, 16, 18 are interactive (in addition to the normal sense of being interactive to website users) in that information entered through one website may be made available to and be used by a user of another website (as described below). Further, it should be understood that while customers 22, 24 may be considered customers in the normal sense of the word, a builder 26 or member of the trades 27, 28, 30, 31 may also be a customer in another sense, as described hereunder. As used herein, a builder is defined as any person who sells a tangible product and who also physically installs that product, or who coordinates labor or a product's installation.

The system 12 of FIG. 1 is shown with a single builder 26, a number of customers 22, 24, a number of trades (suppliers 27, 28 and manufacturers 30, 31). The illustrated embodiment, in fact, will be described primarily in the context of the interaction between the single builder 26 and his customers 22, 24 and suppliers 27, 28 and the interaction between the customers 22, 24 and manufacturers 30, 31. It should be understood, however, that the system 12 may have many such builders 26, each with its own customers 22, 24 and suppliers 27, 28. Further, the customers 22, 24 and suppliers 27, 28 may simultaneously deal with many different builders 26 through the system 12. Manufacturers 30, 31 may deal with many different customers 22, 24 of many different builders 26.

Figure 16:
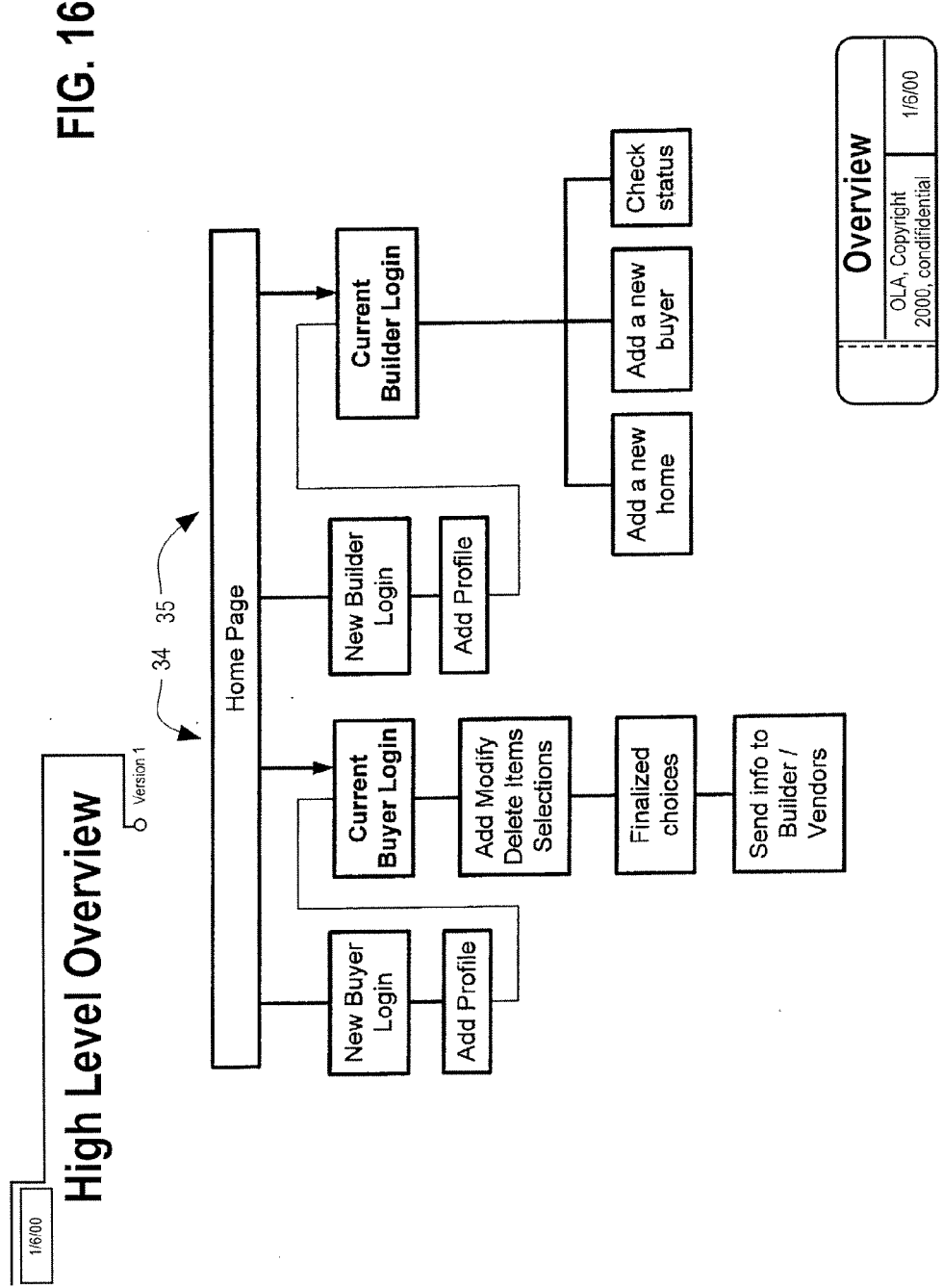
FIG. 16 provides a high level overview of website use of the system of FIG. 1.
Figure 17:
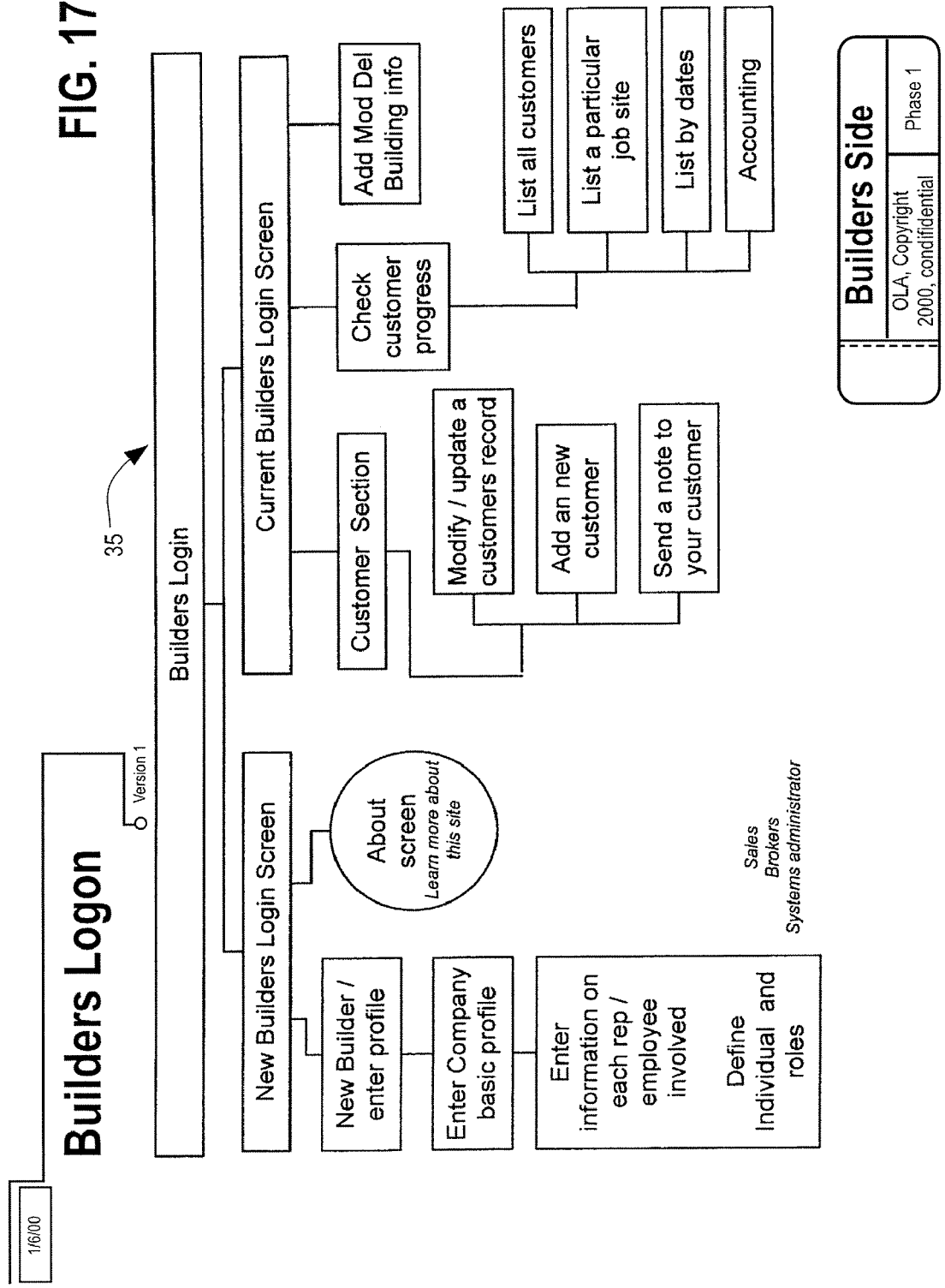
FIG. 17 depicts builder logon and use of the builders' website of FIG. 1.

A builder 26 may maintain one or more webpages 34 on a first website 16 for the benefit of customers 22, 24. The various screens of the webpages 34 may include product offerings relating to many different product spaces as well as standards and options available to buyers (e.g., customers 22, 24). The webpages 34 may also include product offering contracts that may be downloaded by customers 22, 24. FIG. 16 provides a high level overview of activities that may be accomplished by a customer 22, 24 and builder through the website 16.

As used herein, a product space is the physical space within which the product is to be installed. A product offering includes the product as well as the installation of the product in its product space. In the context of new home construction, the product space may be a bathroom, a bedroom or the lot where a house (the product) is to be built.

Further, a product offering on the first website 16 may be a mix and match of various levels of product offerings. For example, a first builder 26 ("A") may have a product offering that may be an integration of the various product offerings which are together commonly referred to as a home.

A second builder 26 ("B") may specialize in a particular type of bathroom. The second builder B (on a first level) may be a subcontractor of the first builder A. A bathroom by B may be included by A in A's overall product offering. As such, a bathroom by B is one of A's product offerings. However, A and B may both maintain webpages 34 on the builders' website 16. In fact, A and B may have webpages customized by each builder 26 for the precise needs of the product offering of the builder 26.

The invention's maintenance of separate webpages 34 for A and B benefit both A and B. For example, if A includes B as a product offering, then A may simply list B as a product offering, linking to B's website to allow a customer 22, 24 to obtain information about the offering. Further, the customer 22, 24 may also want to visit builder C and D to view other product offerings for bathrooms.

The second website 14 may be accessed primarily by customers 22, 24. Customers 22, 24 may open password protected, personal webpages 32 based upon a request transmitted to the CPU 12. The webpage 32 may be used to display information contained within a customer file 42 stored in the database 11. The file 42 may be used by a customer 22, 24 as a personal repository of information from the builder's website 16 either as a potential or as an actual customer of the builder 26. Customers 22, 24 may continue to use the file 42 for personal information even after a sale closes.

The third website 18 may be marketed to the general public and may be accessed by any customer 22, 24 or member of the general public. The third website 18 may be designed similar to a retail store for on-line purchases and project coordination of builder-rehabber products. The third website 18 is intended to feature projects and pricing directed to capital improvements. As such, the third website 18 provides a retail-catalog showroom for manufacturers' (trades') products in a way that will be discussed below in more detail.

Product offerings may be created in any of a number of ways. A builder and customer may sit down and negotiate the terms of a product offering agreement. The product offering agreement may specify an overall product offering (e.g., a house) with many included product offerings (e.g., a kitchen, two bathrooms, etc.).

At least some of the included product offerings (hereinafter referred to simply as "product offerings") may include choices that must be made by the customer 22, 24. In the case where the product offering is a bathroom, the standard options may be a choice between two types of sinks from a particular manufacturer. Alternatively, the term "standard options" may refer to an allowance (i.e., in dollars) which the builder will allow the customer 22, 24 to spend for purchase of the product associated with the product offering.

Under the illustrated embodiment, each product offering is associated with a category space. In some cases a category space may include several product offerings. For example, in the context of a home, a category space may be a bathroom. One product offering associated with the bathroom may be a sink, another may be faucets on the sink, a third may be a toilet or a tub. Other product offerings may be the color or type of paint that may be applied to the walls or whether tile is installed on the floor.

Under an illustrated embodiment of the invention, each category space is associated with one or more pages of a virtual showroom. Within the showroom, the standard options and extras options may be displayed, either as text or under a pictorial format.

The database (DB) 11 is provided with specific information with regard to the products contained within each product offering. The CPU 12 and DB 11 interact to form a relational database that is able to select categories based upon a category space. A menu associated with the virtual showroom allows the CPU 12 to select and organize category cells matching product with category spaces and "drill down" to the essential information for decision making. The menu also allows the CPU 12 to verify selected products' compatibility, and to assess selected products' installation details.

Alternatively, the CPU 12 may organize the category cells based upon brand identity (i.e., the name of the manufacture) or based upon stylistic groups (i.e., a Martha Stewart collection). Organization of cells may be altered by the customer 22, 24 based upon entry or selection of key words within an interactive window associated with particular segments of the virtual showroom.

Where a product has been identified in advance by the builder 26, a category cell may include the identified product as a standard option. The category cell may contain other standard options as well as extras options. Where no product has been identified (i.e., the contractor has given the customer an allowance for purchase of a product), the category cell may include hyperlinks to a website 38 of a manufacturer 30 who offers products which fall within the category cell, or may simply calculate a credit for no product selection.

To simplify selection of product offerings, a builder 26 may maintain a list of standard product offerings on his website 16 or on the system's 12 website. Information about standard product offerings may be accessed by customers 22, 24 to purchase a product offering or to simply comparison shop among builders 26. Builders 26 and new homes associations will be able to co-brand or cooperatively advertise their services in conjunction with this information.

Following is a detailed example of a product offering set in the context of a home purchase. While the detailed example is set into the context of home buying, it should be understood that a product offering may be made in commercial, office, retail, or any other specialty construction. Further, such a product offering may be set in any context involving the transfer of goods in conjunction with interrelated services.

FIGS. 16-22 are flow charts that are specifically related to the methods described above and set in the context of home building. Reference shall be made to FIGS. 16-22 as appropriate to an understanding of the invention.

The customer 22, 24 may access the information of webpage 34 of the builder 26 using several different routes. As a first route, the customer 22, 24 may enter the builder's website 16 through the front door (directly from the customer 22, 24 to the website 16 through the Internet 20) and view product information and options. The steps of logging-in under this process may be better understood by reference to the left side of FIG. 16. Using this approach, the customer 22, 24 does not have local storage at the website 16.

Figure 19:
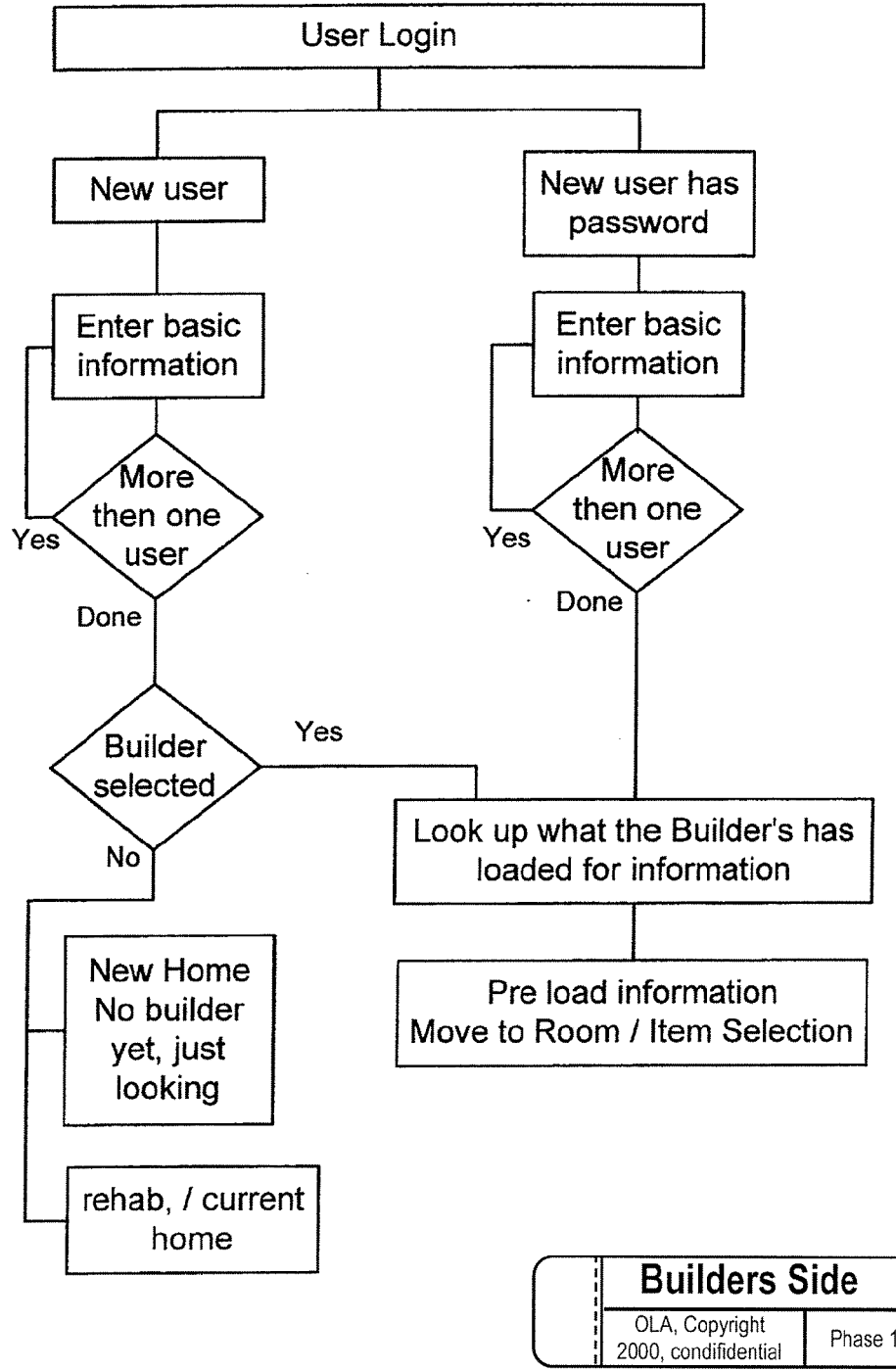
FIG. 19 depicts a new customer logon to the system of FIG. 1.
Figure 20:
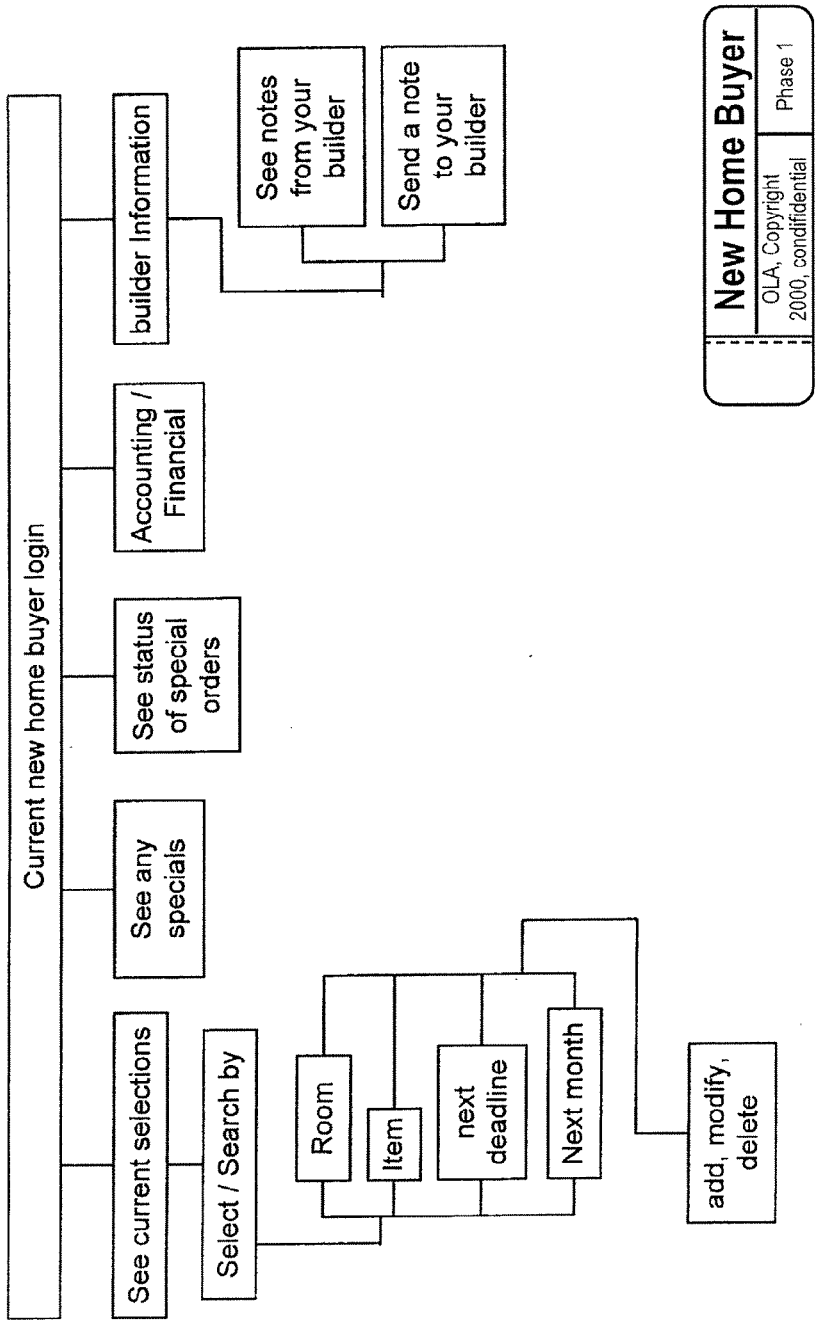
FIG. 20 depicts logon to the system of FIG. 1 by an existing customer.
Figure 22:
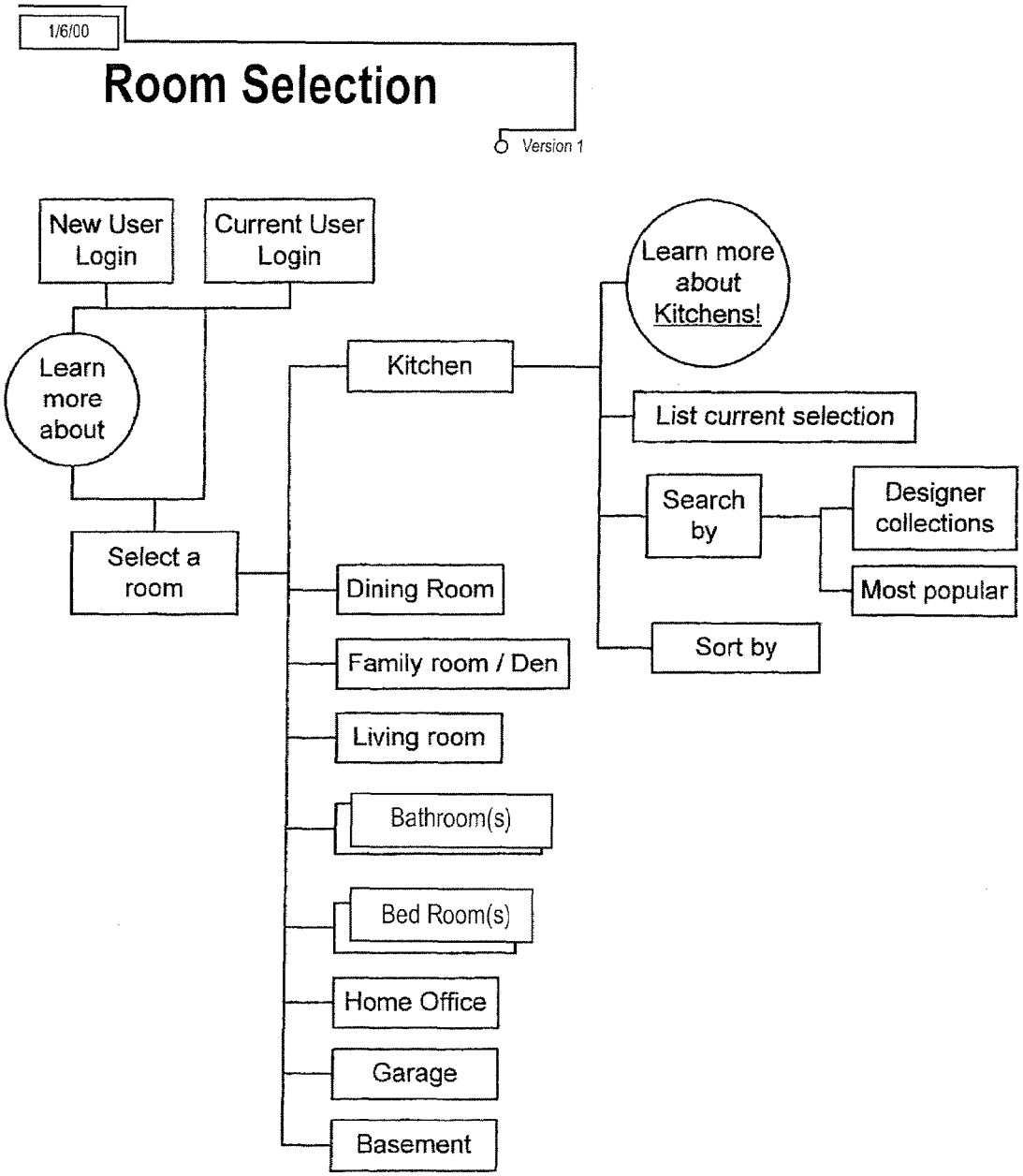
FIG. 22 depicts an options selection screen used by the customer of FIG. 1.

Alternatively, the customer 22, 24 may access the webpage 34 of the builder through another door (i.e., the back door). Accessing the builder's webpage 34 through the back door is accomplished through the customers' website 14. Reference may be made to FIGS. 19 and 20 for a better understanding of the log-in procedure. Customers also may access builder information through the system's 12 start page, or by traveling to the system 12 from one of the system's 12 promotional or related links.

If the customer is a new user, then he may be asked for a name or other identifying indicia. The user may also be asked to select and use a password. Further, as shown in FIG. 19, more than one user may share a customer file 42. The ability for more than one user to share a file 42 may be of use when a buyer wishes to share information associated with a home purchase with another party, such as a mother-in-law, a spouse, a broker, an interior designer, or other family.

The customer 22, 24 may locate the webpage 34 of the builder 26 through a local directory of builders offered through the website 14. Upon locating the webpage 34 of the builder 26, the customer 22, 24 may review and store information from the builder within the customer's file 42.

If a customer 22, 24 has not already requested a personal webpage 32, a webpage 32 may be opened once the customer has reached agreement with the builder 26 as shown in FIG. 18. Before or after a customer 22, 24 signs a building contract, the builder 26 may help the customer 22, 24 open a customer file 42 in the DB 11. The builder 26 may also provide a personalized file or webpage 32 for the customer 22, 24 on the customer's website 14, customized to the house selected by the customer 22, 24, so that the customer 22, 24 may further customize his house. The customer 22, 24 and builder 26 may share passwords for access to the customer file 42.

If the customer 22, 24 had already opened his own webpage 32, then the customer 22, 24 may already have downloaded information (FIG. 20) regarding the selected house, or a generic typical house to his file 42. In either case, the customer 22, 24 may or may not be required to share use of the file 42 with the builder 26.

Using the webpage 32, the customer 22, 24 may view and select standard options and extras for his particular choice of homes, which may be stored in the customer file 42. As the customer 22, 24 selects standard options and extras through his webpage 32, the builder 26 may review those selections through his website 16, if he has been given access to the customer file 42. Alternatively, the customer 22, 24 may e-mail a file containing one or more selections to the builder 26.

Under the illustrated embodiment, an owner of the third-party website provider 12 may receive a fee or commission for processing the selections of each customer 22, 24. The commission may be a flat fee, a percentage of purchases, or third-party revenues, such as advertising or data sales. The details, scope and situations giving rise to a commission will be discussed in greater detail below.

Figure 2:
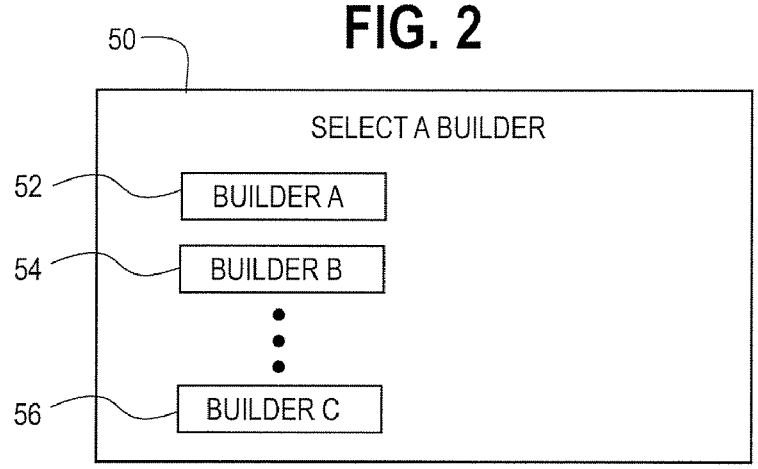
FIG. 2 is a screen of a webpage that may be viewed through the system of FIG. 1.

FIG. 2 depicts a builder's directory webpage 50 that may appear on the customer's terminal 22, 24. The builder's directory 50 may be viewed either through the builder's website 16 or though the customer's website 14. As shown, a customer 22, 24 may be offered the opportunity of viewing webpages 34 of any of a number of builders, or of a particular builder's homes and/or product selections. A customer 22, 24 may view a webpage of a particular builder by activating a softkey 52, 54, 56 associated with a selected builder.

Figure 3:
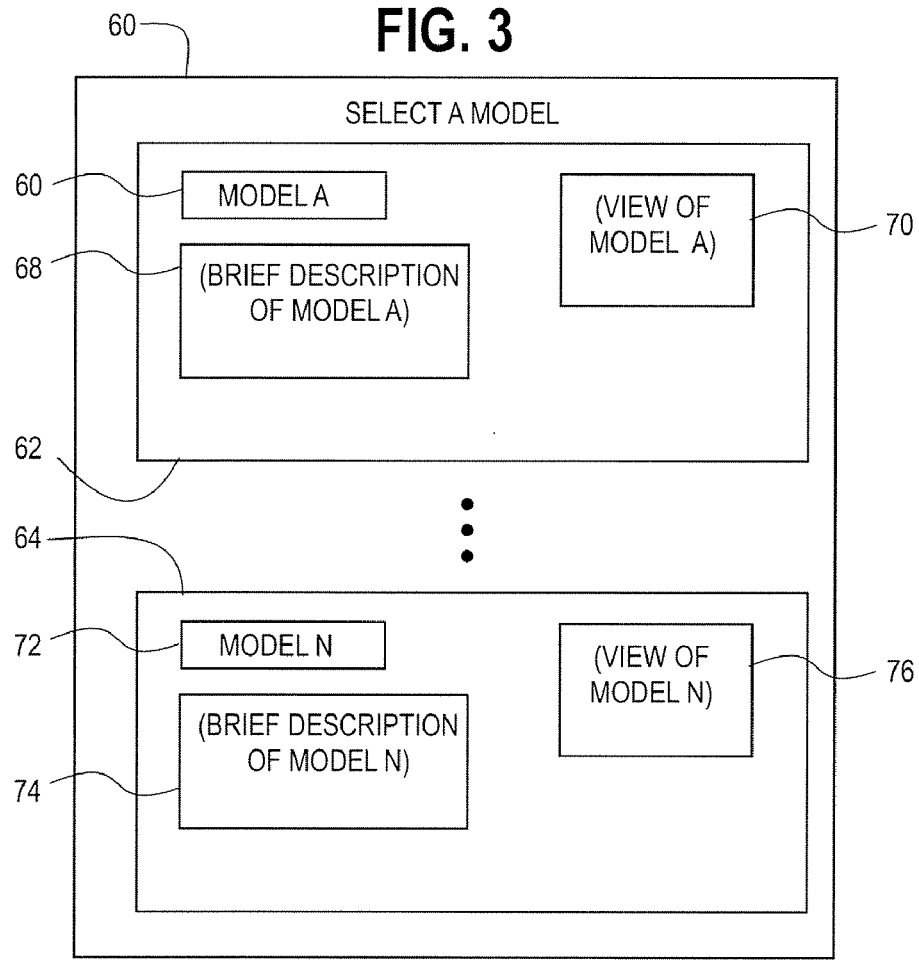
FIG. 3 is a screen of a webpage of a builder that may be viewed through the system of FIG. 1.

FIG. 3 depicts a webpage 60 that may be presented to the customer 22, 24 based upon activation of a particular softkey (e.g., 52) of FIG. 2. (Webpage 60 is depicted as webpage 34 of FIG. 1 where the customer 22, 24 accesses the website directly through the builders website 16 or as webpage 32 where the customer 22, 24 accesses the builders information through the customers website 14.) As shown on the builder's webpage 60, the customer 22, 24 may be presented with a number of product offerings (e.g., appliances, floorings, fixtures, house models, or room changes) 62, 64 offered by that particular builder. As shown, each model or product may have a description of each model or product 68, 74 as well as a picture of the model or product 70, 76. Each model or product may also have a softkey 66, 72 which may be used to obtain more information (e.g., manufacturer or warranty information).

Figure 4:
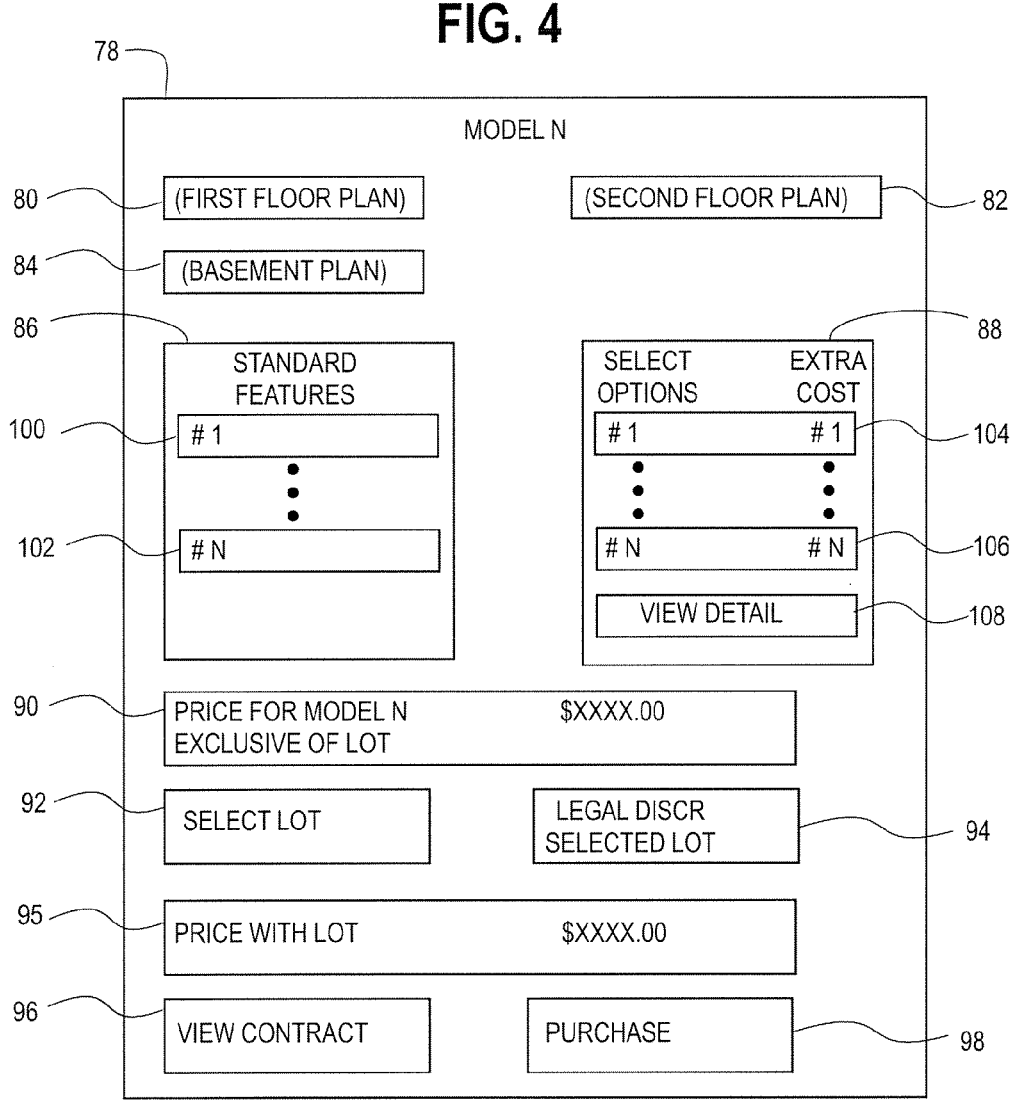
FIG. 4 is a screen showing a model of a home that may be offered by the builder using the system of FIG. 1.

Upon activation of a softkey (e.g., 66) of FIG. 3, the webpage 78 of FIG. 4 may appear on the customer's terminal 22, 24 showing details of the selected product offering. As shown, floor plans 80, 82, 84 may be provided of the selected model as well as a list of standard features (standards) 86. Details of the standards 86 may be viewed by activation of a particular feature key 100, 102.

Also shown in FIG. 4 is a list of optional features 88. Shown associated with each option 104, 106 is a price adder or credit. Details of the option 104, 106 may be obtained by first activating a view detail key 108 and then activating a softkey 104, 106 associated with the option 104, 106.

Activating (e.g., double-clicking on) the option key 104, 106 results in selection of the option 104, 106 for purchase. The selected option will then be included in the overall house purchase.

Selection of options 88 causes a price window 90 to change based upon the number of options selected. The price shown in price window 90 may be exclusive of the cost of the lot. To select a lot, the customer 22, 24 may activate a select lot key 92.

Figure 5:
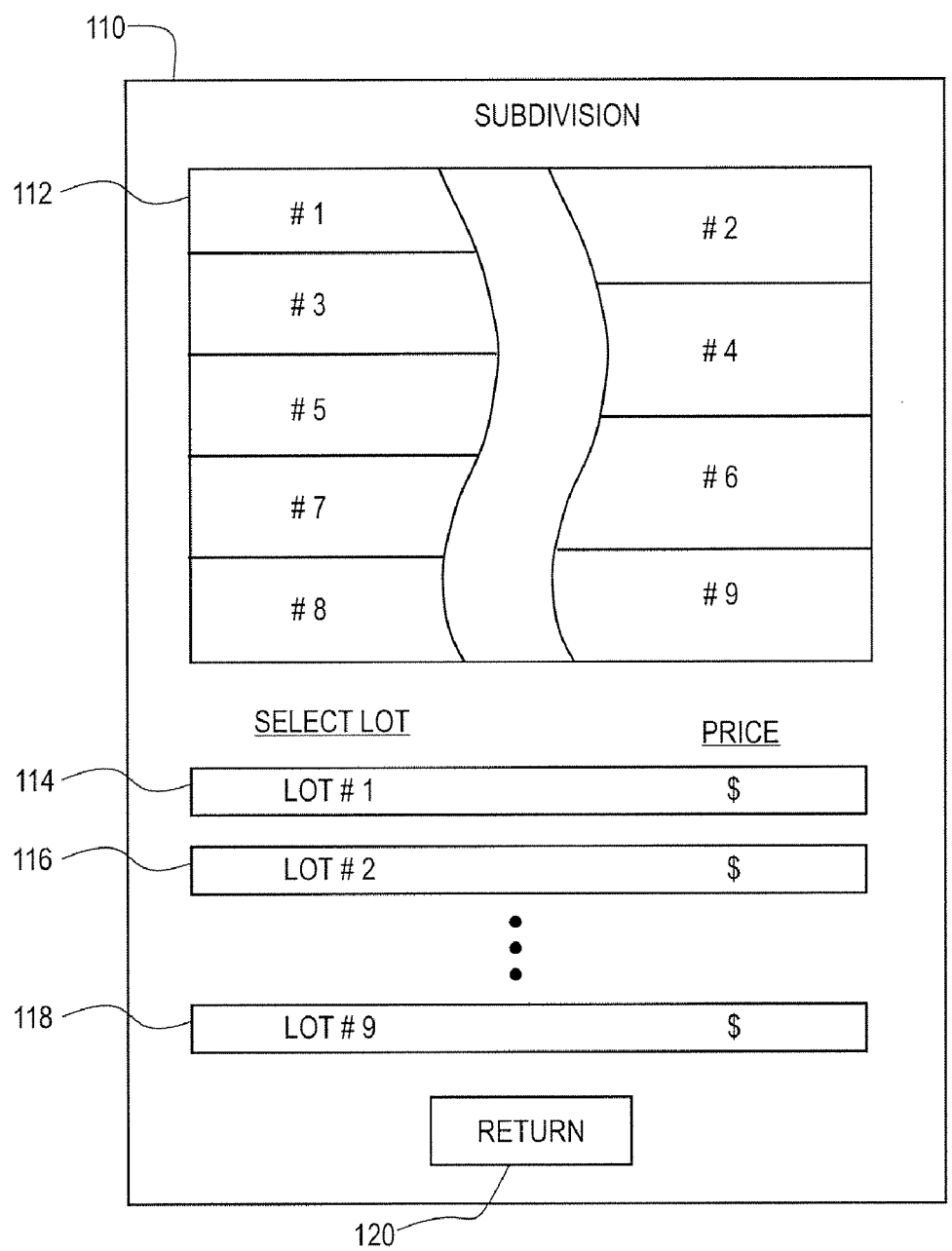
FIG. 5 depicts a subdivision that may be marketed using the system of FIG. 1.

Upon activating a select lot key 92, the webpage 110 of FIG. 5 may appear. Shown on the webpage 110 may be a subdivision map 112 showing available lots. Also shown may be a softkey 114, 116, 118 showing a lot number and price associated with each lot.

Upon identifying a suitable lot by activating a softkey 114, 116, 118, the customer 22, 24 may activate a return key 120. Activation of the return key 120 may take the customer 22, 24 back to the previous webpage 78.

By returning to the previous webpage 78, the selected lot may now be identified in a lot window 92 along with a legal description of the lot in another window 94. The total cost of the house may now be displayed in a total price window 95.

Upon reviewing the details the customer 22, 24 may now accept the purchase by activating the purchase softkey 98. In response, the purchase offer webpage 122 of FIG. 6 may be presented to the customer 22, 24. Included within the purchase offer webpage 122 may be the home model number 124, the selected options 126, the legal description of the selected lot 128 and a total price 130.

A buyer's window 132 is presented for entry of identifying information about the customer 22, 24. Within the buyer's window 132, the customer 22, 24 enters his name in a name window 142, address in an address window 144 and telephone number in a phone window 146. The customer 22, 24 is also provided with a credit reference window 148 for entry of credit references as well as an e-mail window 150 for entry of an e-mail address.

A customer file identifier window 152 is also provided in the case where the customer 22, 24 accesses the builder's webpage 34 through the customer's website 14 and has already established a customer file 42. The identifier of the customer file 42 may be automatically inserted into the identifier window 152 by the CPU 12.

Included on the purchase offer webpage 122 is a required deposit window 134 showing the deposit required to close the deal. Also included is a window 136 where the customer 22, 24 may enter a method of deposit payment.

Once the customer 22, 24 has entered his personal information, the customer 22, 24 may activate a print softkey 138 to print a copy of the product offering contract 122. The information entered into the various boxes 124, 126, 128 130, 132, 134, 146 may be incorporated into the appropriate fields of a real estate contract or contract amendment for upgrades that the customer 22, 24 may sign and forward to the builder 26. A second, submit purchase offer softkey 140 is also provided to submit an unsigned copy of the offer to the builder. Additional output forms can be generated in support of the processing of the building order, such as a jobsite copy, purchase order, lender information, etc.

Figure 35:
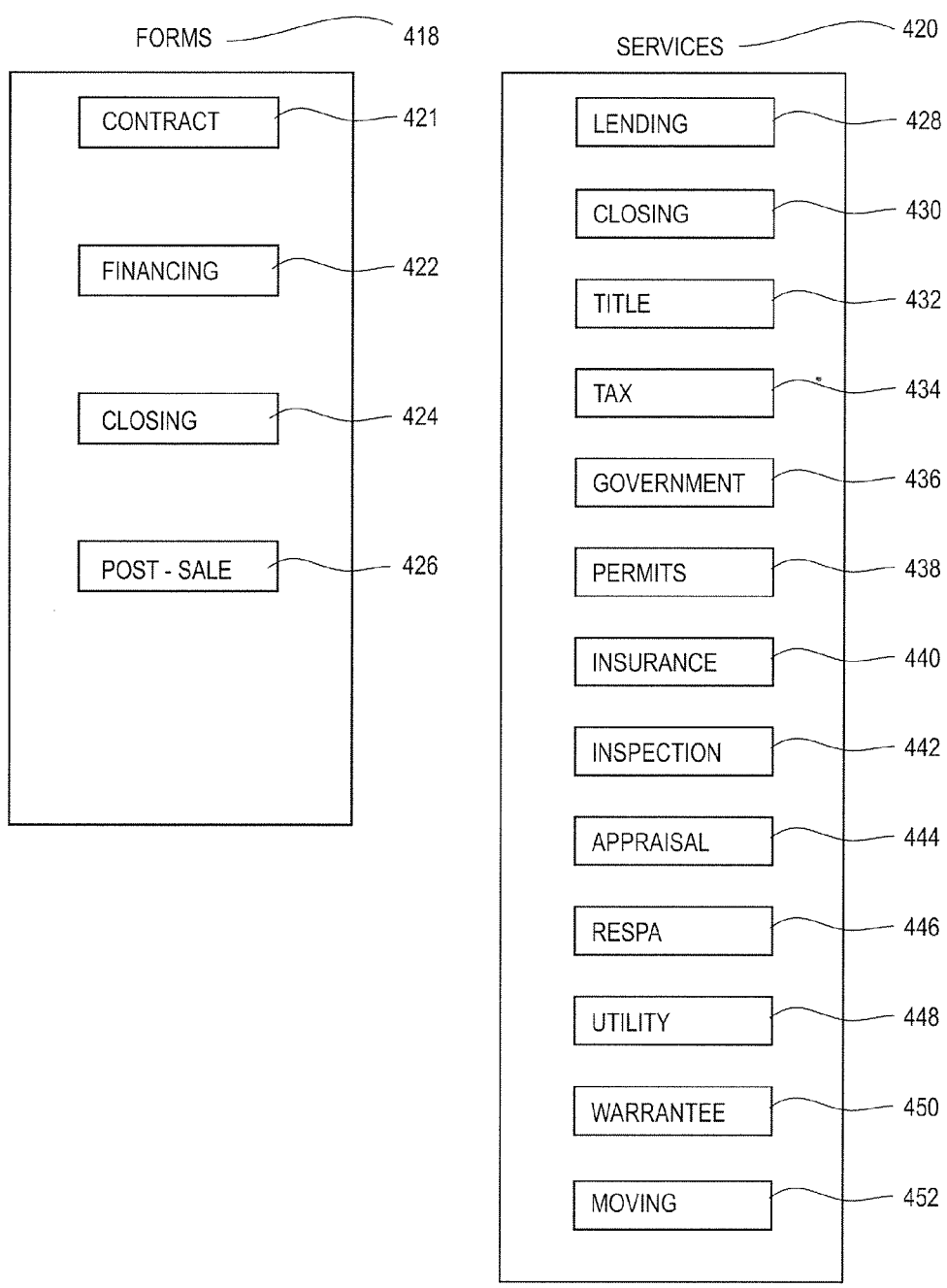
FIG. 35 depicts various forms and services that may be used by customers and builders using the system of FIG. 1.

In conjunction with the product offering contract, the system 10 may include a forms library to provide a variety of related forms 418 and services 420 (FIG. 35). Forms 418 may include contract 421, financing 422, closing 424, and post-sale 426 forms. Services 420 may include lending 428, closing 430, title 432, tax 434, government 436, permits 438, insurance 440, inspection 442, appraisal 444, RESPA 446, utility 448, warrantee 450, and moving 452.

The builder 26 may access offers through a second webpage 35 of the builder's website 16. Upon accessing the webpage 35, the screen 142 of FIG. 7 may be presented to the builder 26. As shown, the builder 26 may be required to enter a name and password in a name and password window 144, 146.

Upon entry of a name and password (and verification by the CPU 12), the CPU 12 may present the builder 26 with a menu webpage 150 (FIG. 8). The process of builder access to the website 16 may be better understood by reference to FIG. 17. From the menu webpage 150, the builder 26 may activate a purchase offers softkey 152 and be presented with a list of purchase offers in a purchase offers webpage 160 of FIG. 9.

Within the purchase offers webpage 160, the builder 26 may select purchase offer #1 162 for review. In response, a summary page 170 of FIG. 10 may be provided for review by the builder 26. Contained within the screen 170 may be a window 172 containing the purchase information entered by the customer through screen 122. The builder 26 may review the information and activate either an accept softkey 174 or a reject softkey 176. The builder 26 may conditionally accept or reject the offer before the signed copy of the contract arrives or if the deposit is insufficient. The builder 26 may also condition his acceptance or rejection on field conditions or his sub-contractors.

Upon acceptance of an offer, the CPU 12 first checks to see if the customer 22, 24 has a customer file 42. If the customer 22, 24 does not, the CPU 12 opens a file 42 for the customer 22, 24. In addition, the CPU 12 retrieves a features and options list from the builder's file 44 and transfers the features and options list to the customers file 42. Each entry of the features and options list has a field that relates the feature and option to a product space. The features and options list represents a list of choices that a customer 22, 24 may have in the construction of the purchased home.

For example, the features and options list may include options for standard features and extras. Standard features options may include fixtures that may be selected at no extra cost. Extras options may be options that may available among the upgrades that may have previously selected or may now be added. Extras options may be unique, or may replace standards features.

As a final step, the CPU 12 may compose an e-mail (or printed) message to the customer 22, 24 announcing acceptance of the offer. If the customer 22, 24 did not previously have a customer file 42, the e-mail message may identify the file and provide instructions for accessing the file 42 through the customer's website 14. The message may also include general instructions as to the types of selections that the new home buyer may need to make, and procedures and due dates for making selections.

The e-mail may also include instructions as to how to transfer selections to the builder 26. The customer 22, 24 may be given the option of sharing a password with the builder, allowing the builder 26 to access the customer's file 42. Alternately, the customer 22, 24 is given the options and instructions of how to e-mail selections to the builder 26.

Following the instructions of the e-mail, the customer 22, 24 may access the customer's website 14 and be presented with the virtual showroom options webpage 180 of FIG. 11 based upon the builder's features and options list transferred from the builder file 44 to the customer file 42. The process of customer access to the virtual showroom may be better understood by reference to FIG. 22. The entries of the showroom options webpage 180 may be divided by product space (e.g., kitchen 182, living room 184, bath #1 188, bath #2 190, bedroom #1 192, bedroom #2 194, bedroom #3 196), by overall function (e.g., heating 198, air conditioning 200, house exterior options 202, fireplace 204), or by design criteria (e.g., modern 199, traditional 201, chrome 203, brass 205). Further, some entries (e.g., kitchen 182, baths #1 #2 188, 190) may be accompanied with drawings to further clarify the scope of the optional features.

Figure 12:
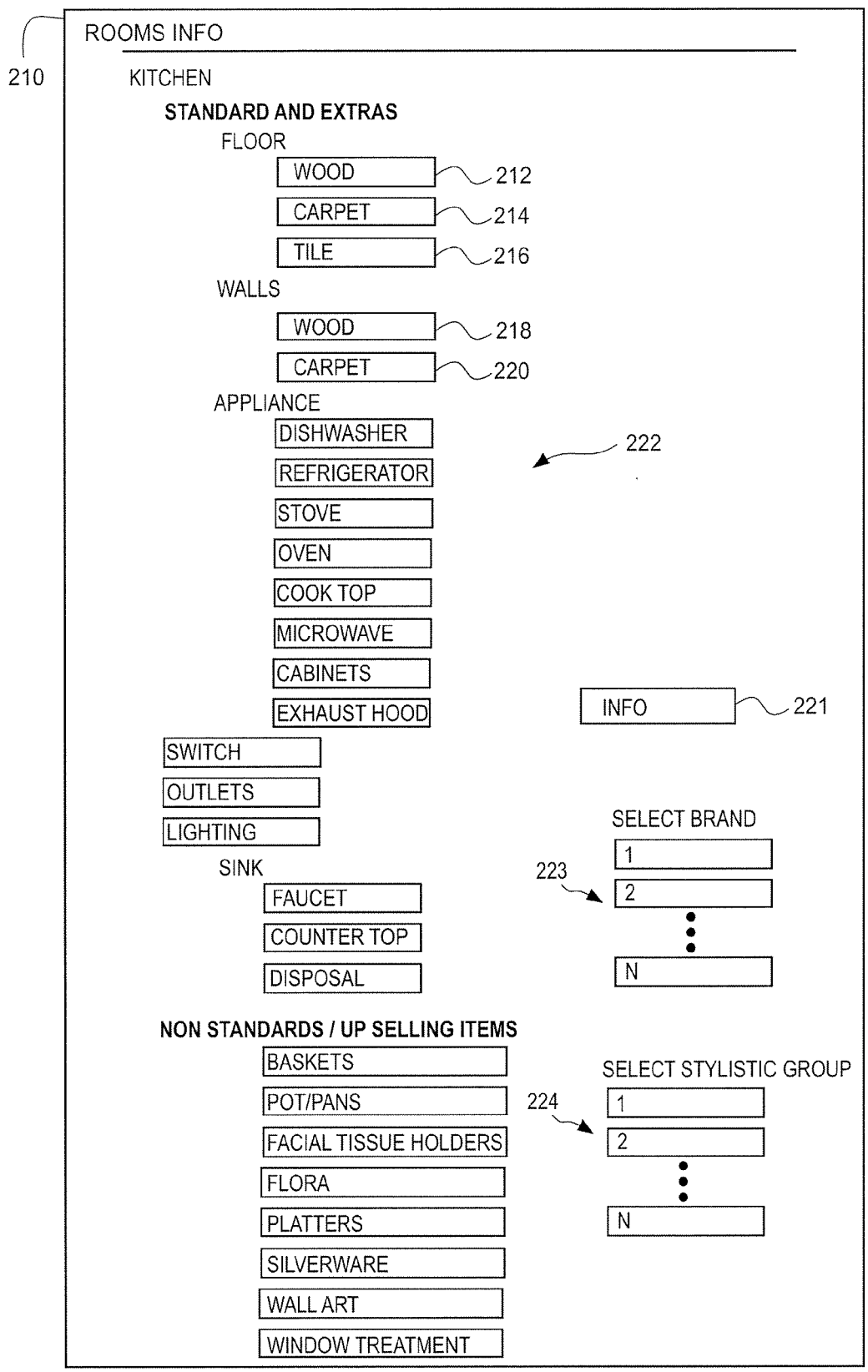
FIG. 12 depicts an options selection screen that may used by a customer of a builder using the system of FIG. 1.

If the customer 22, 24 were to activate the kitchen softkey 182 of FIG. 11, then the screen 210 of FIG. 12 may be presented to the customer. Included within the screen 210 of FIG. 12 are a set of choices that the customer 22, 24 may have regarding construction of the kitchen.

Figure 23:
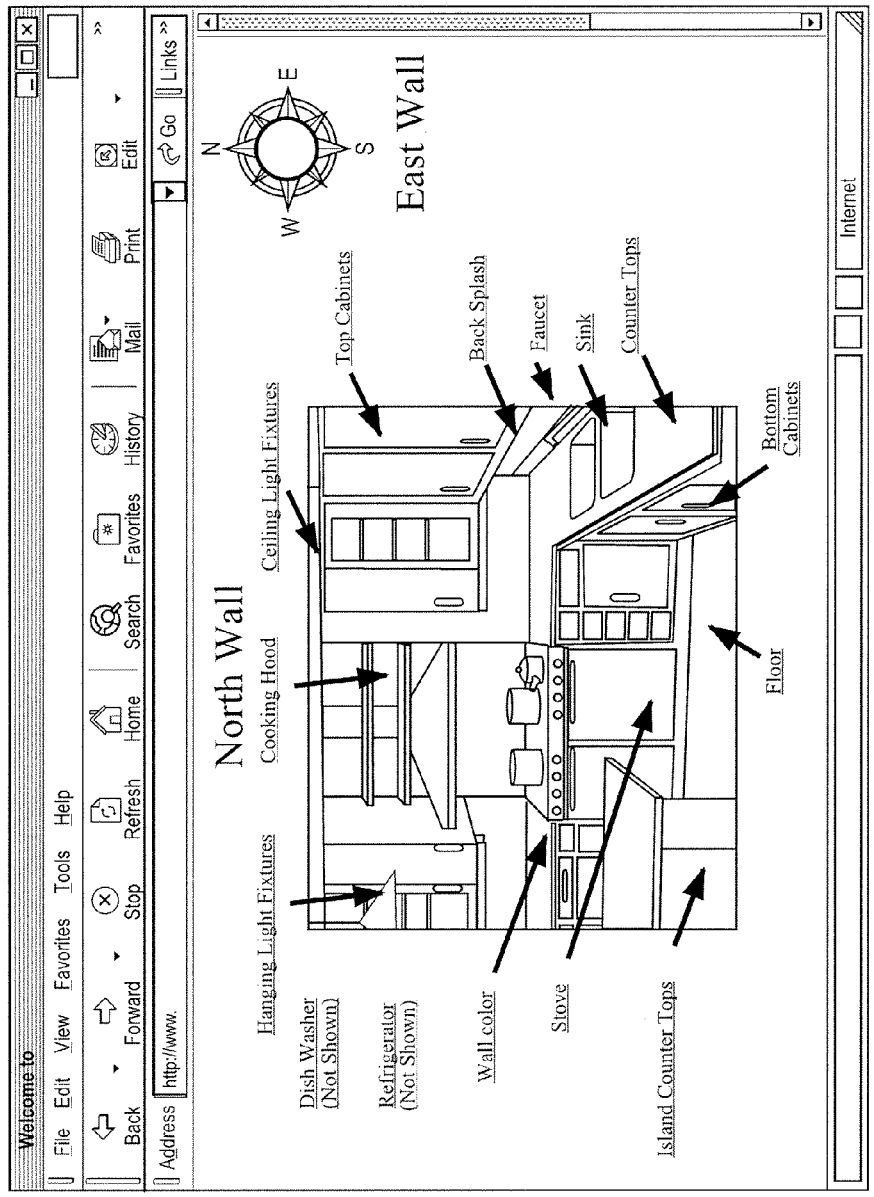

As a first step, the customer 22, 24 may activate a "view kitchen" softkey 211. In response, a graphical image (FIG. 23) may be presented to the customer 22, 24 providing the customer 22, 24 with the opportunity of viewing a kitchen using standard options, a kitchen with certain extras, or both.

Figure 24:
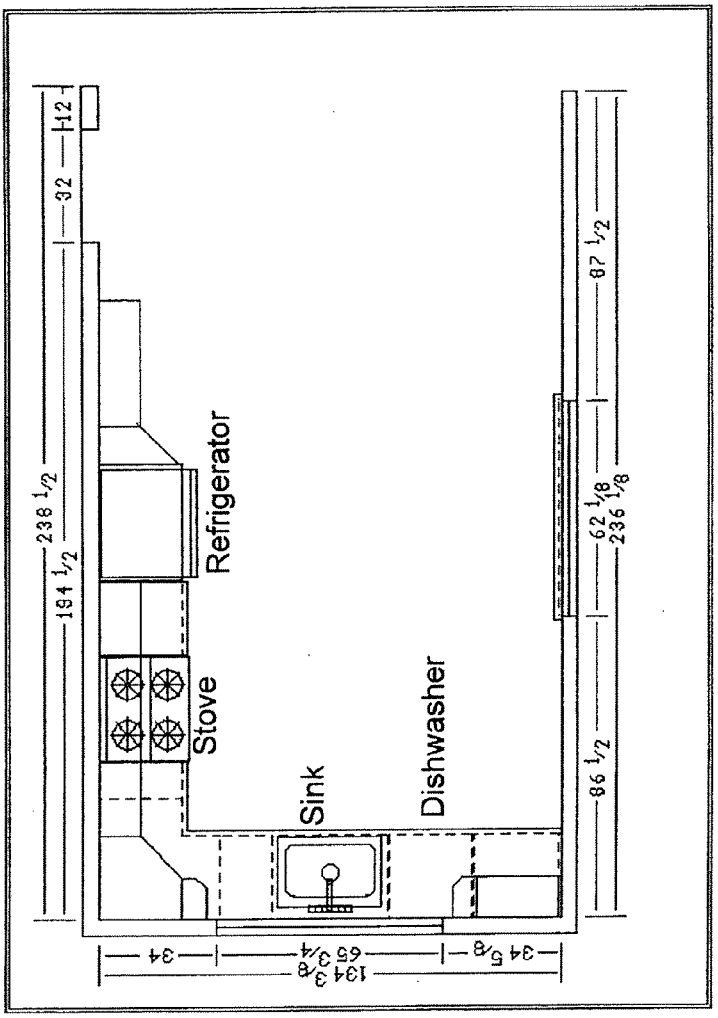

Alternatively, the customer 22, 24 may wish to view a kitchen layout. To view a layout, the customer 22, 24 may activate a layout softkey 213. Upon activation of the layout softkey 213, the customer 22, 24 may be presented with an overhead view (FIG. 24) of the kitchen.

After viewing the kitchen, the customer 22, 24 may proceed with the selection of standards and extras. For example, the customer 22, 24 may determine that carpeting may be the best choice of a floor covering for his kitchen. Accordingly, the customer 22, 24 may press the carpet softkey 214.

Figure 13:
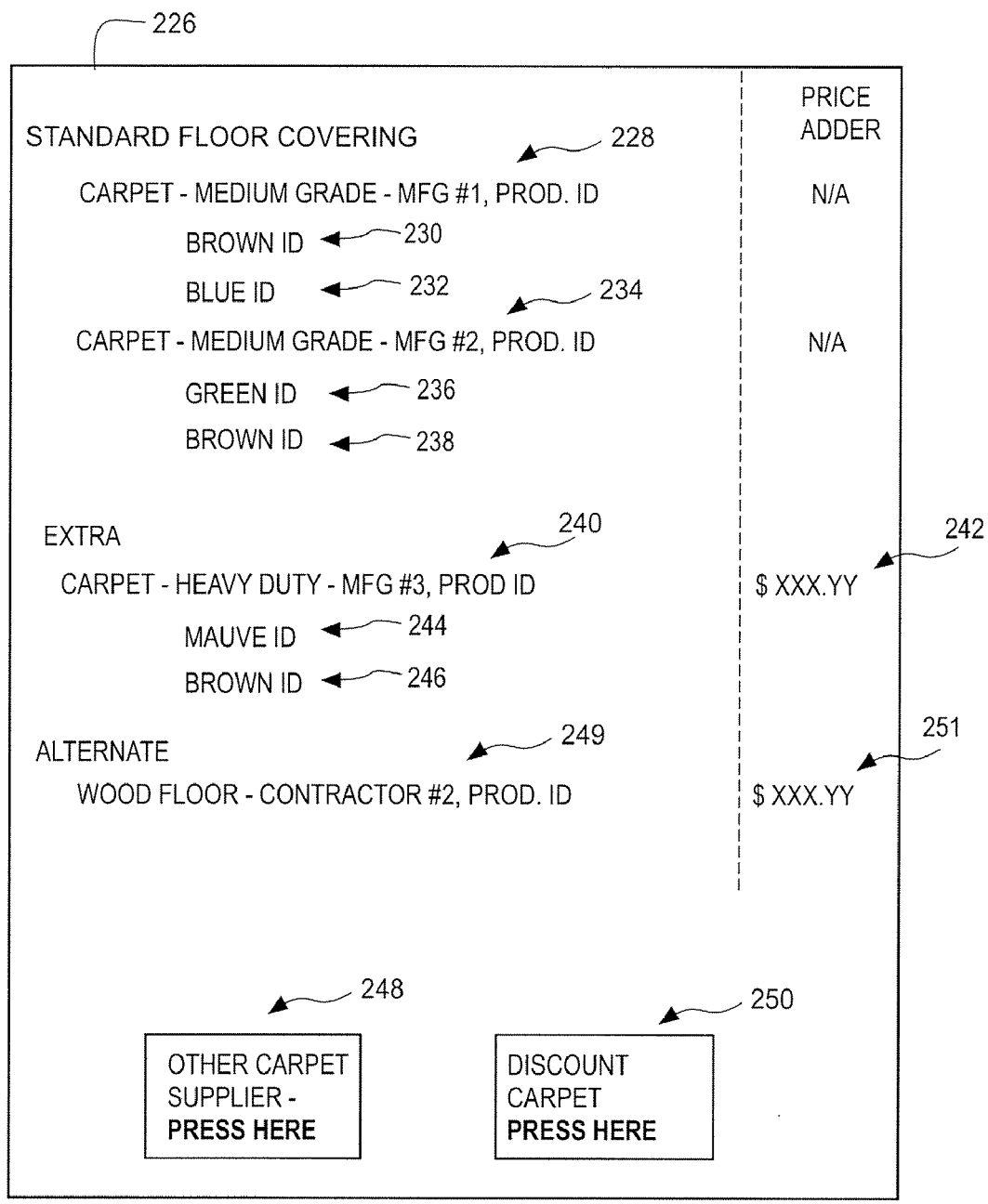
FIG. 13 depicts a more detailed options selection screen that may used by a customer of a builder using the system of FIG. 1.

In response, the customer 22, 24 may be taken to the carpet selection screen 226 (FIG. 13). The carpet selection screen 226 provides at least two carpet selections 228, 234 as standard options for the customer 22, 24. As such, the customer 22, 24 could select either of the two standard options 228, 234 at no additional cost (as shown by the N/A entry in the PRICE ADDER column).

Alternatively, the customer 22, 24 may select a better carpet 240 also offered by the builder 26. As shown, the better carpet 240 may be offered at a price adder 242.

As a further alternative, the customer 22, 24 may choose to select a product offering of a customer wood floor 249 by another contractor. In this case, a different price adder 251 would be included.

As shown in FIG. 13, selection of a carpet option is not complete by selection of the carpet by itself. Also necessary to complete a carpet selection is a color selection. If the customer 22, 24 were to select the first carpet selection 228, then the customer 22, 24 would have the choice of brown or blue. The customer 22, 24 would make such a selection by pressing the appropriate soft key 230, 232.

If the customer 22, 24 had selected carpet from the second supplier 234, then the customer 22, 24 may select other colors based upon other softkeys 236, 238. Similarly, if the customer 22, 24 were to select the optional carpet 240 at added cost, then he may select available colors by activation of related softkeys 244, 246.

The system 12 may further suggest related (but not required) products and upgrades to customers 22, 24. For example, if a customer 22, 24 selects a wood floor 249, the system could suggest a throw rug.

If the customer 22, 24 were not happy with the standard options, the customer 22, 24 may activate hyperlinks 248, 250 to other suppliers (i.e., manufacturers 30) not associated with the builder 26. Purchase of carpet from the other suppliers through hyperlinks 248, 250 may be accomplished using methods well-known in the art.

In another alternative, the customer 22, 24 may choose to select a brand name 223 or stylistic group 224, before making other selections on screen 210. In this case, the manufacturers of FIG. 13 may be limited to the selection made as opposed to the products preselected by the builder 26.

Figure 25:
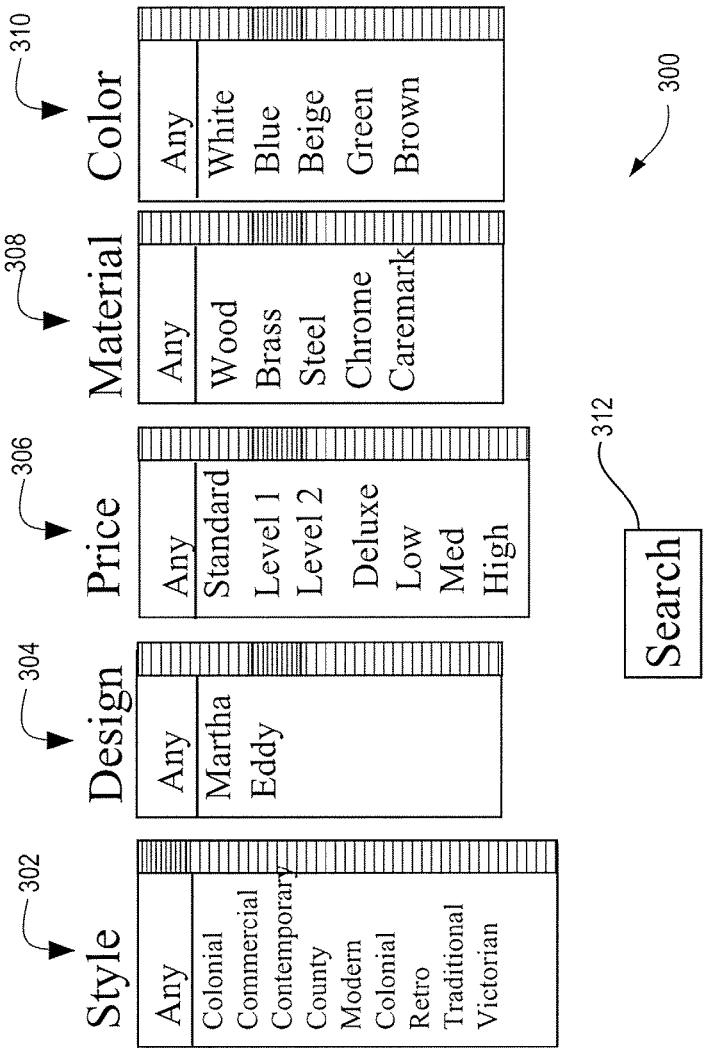

For example, the customer 22, 24 may first activate the selection of "refrigerator" from the appliances list of FIG. 12 and then brand 223 and/or stylistic group 224. In response, the screen 300 of FIG. 25 may be presented. Within the screen 300, the customer 22, 24 may specify a search criteria for a refrigerator. The customer 22, 24 may specify a style criteria 302, a design 304, a price 306, a material 308 and/or color 310.

Figure 26:

FIG. 26 shows a possible search criteria that may be selected by the customer 22, 24. Upon completion of the selection of the search criteria, the customer 22, 24 activates the search key 312.

Upon activation of the search key 312, the screen 320 (FIG. 27) may be presented showing search results. Shown in the screen 320 may be a number of product options as well as identifying information about those options. Shown along a top of the screen 320 is the search criteria returning those results. Upon reviewing the results, the customer 22, 24 may wish to see more information about the first search result. To obtain more information, the customer 22, 24 may activate the "see more info" key 322.

Activating the more info key 322 may take the customer 22, 24 to the more info screen 330 (FIG. 28) which shows additional detail of the selected product. Upon reviewing the information, the customer 22, 24 may select the option by selecting "add to my cart" 326 or return to the previous screen by activating the search key 332.

Figure 29:

As an alternative, one of the search results of screen 320 may have been a hyperlink 328 to the refrigerator manufacturer Sub-Zero. Activation of that hyperlink may take the customer to screen 340 (FIG. 29). From screen 340, the customer 22, 24 may view any of a number of Sub-Zero products by activation of the proper additional hyperlink.

Further, research may indicate that buyers of a particular product or stylistic group (e.g., the Martha Stewart Collection, or traditional wood trim) are more likely to purchase other related household items (e.g., baskets, floral patterns, etc.). Accordingly, selection of the identified products may also trigger a window asking the customer 22, 24 if he/she also wants to purchase the related item as part of an upselling opportunity.

In another alternative, the customer 22, 24 may activate an information softkey 221 and be taken to the screen 225 of FIG. 21. Screen 225 may be used by the customer 22, 24 for purposes of reviewing a current selection, other popular choices or a designer collection.

It should be understood that the CPU 12 of the system 12 tracks use of the hyperlinks 248, 250 and charges a fee or commission on any views and/or purchases based upon the use of such hyperlinks 248, 250. Such commission may be charged to the hyperlink destination (e.g., the manufacturer 30), based upon any sale made by the builder 26 or his sub-contractors of the manufacturer's 30 products to the customer 22, 24.

Returning now to FIG. 12, the customer 22, 24 may proceed through each of the standards and extras making selections as appropriate. If appliances 222 were included in the real estate contract, then the customer 22, 24 would be prompted to make a selection for each included appliance including make and color. The system will provide coordinated information on product promotions, such as "sale" products, or newly offered products.

Once options are selected for the kitchen, the customer 22, 24 may return to the menu 180 in FIG. 11 and individually proceed through each selected item 182, 184, 186, 188, 190, 192, 194, 196, 198, 200, 202, 204, 199, 201, 203, or 205 making required selections. While many items would require an explicit selection from the customer 22, 24, some items need not be explicitly chosen by the customer 22, 24. For example, wall color in the contract may have been negotiated to be an off-color white. In this case, the builder may omit paint color, or any new choice from the builder's features and options list transferred to the customer's file 42.

Figure 36:
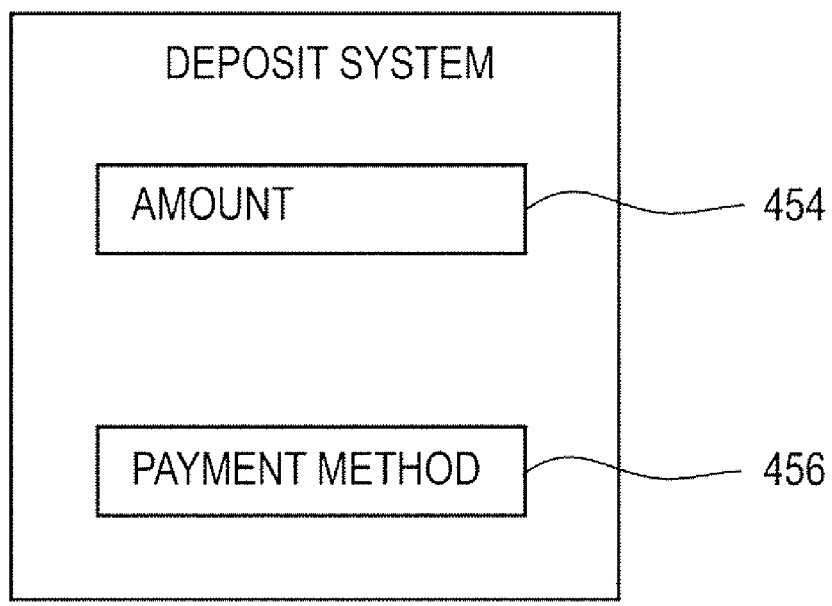
FIG. 36 depicts an online deposit system that may be used by a customer of a builder using the system of FIG. 1.

Once the customer 22, 24 has completed his selections from the features and options list, the customer 22, 24 may activate a selection complete softkey 206. A deposit window 454 (FIG. 36) may then appear, allowing the customer to place a deposit on his selections. Also included is a window 456 where the customer 22, 24 may enter a method of deposit payment (e.g., a check, credit card, debit card, etc.) for entry into a deposit account within the system 10. Activation of the selection complete softkey 206 may cause the CPU 12 to compose an e-mail message to the builder 26 summarizing the selections made by the customer 22, 24. Alternatively, where the builder 26 and customer 22, 24, share passwords for the customer file 42, the builder 26 may simply retrieve the selections list directly from the customer file 42. Manufacturers 30, 31 may be allowed to pre-view these selections, or may see an aggregate of selections among customers 22, 24 or builders 26.

The CPU 12 may verify and track selections made by the customer 22, 24. The CPU 12 also may collect data regarding selections made by the customer 22, 24, to track buying trends. The buying trends may be collected into a buying trends database. Buying trends data that may be collected includes, but is not limited to, product views, partial selections, final selections, and demographics.

As an aid to completing the selection of options, a number of reminder features are offered by the system 10. For example, during feature selection from appropriate portion of the showroom (e.g., screen 330, FIG. 28) the customer 22, 24 may review a selection status ledger.

Figure 30:
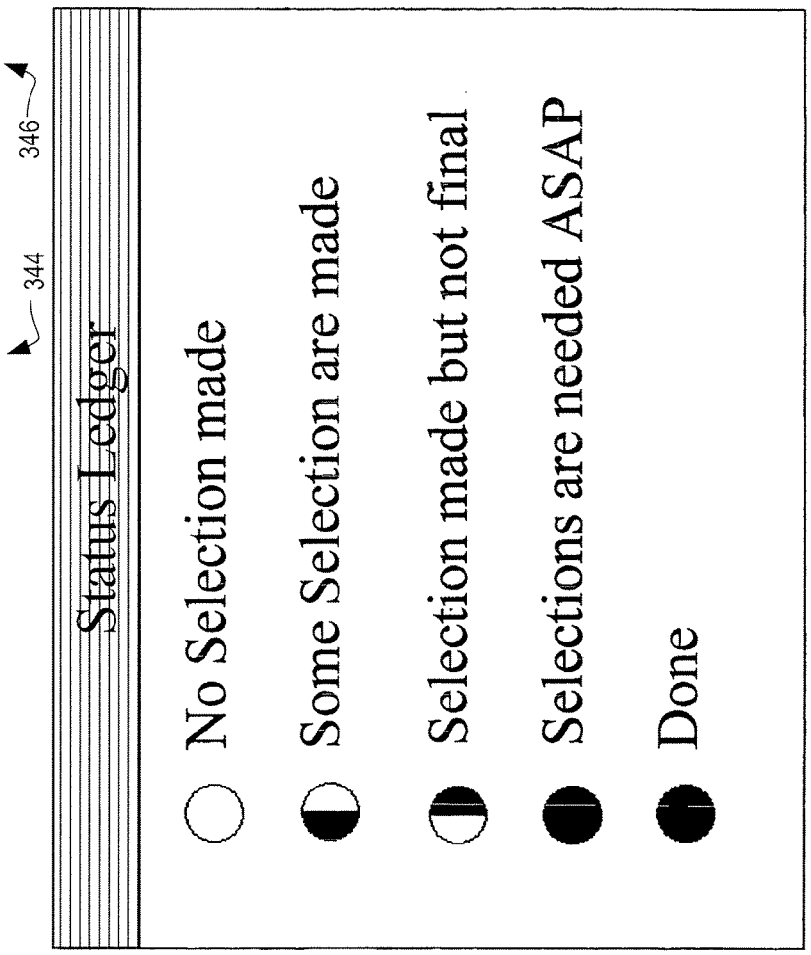
FIG. 30 depicts a status ledger that may be used by a customer of a builder using the system of FIG. 1 to determine what additional selections need to be made.

To review the selection status ledger, the customer 22, 24 may activate a softkey of selections to be made 344 or selection deadlines 346. Upon activation of the selections to be made softkey 344, the customer 22, 24 may be taken to the screen 350 of FIG. 30.

Shown along the left margin of screen 350 is a graphical status indicator 352 of the selection status. The graphical status indicator 352 may be used as a shortcut into the showroom for unselected product offerings.

Figure 31:
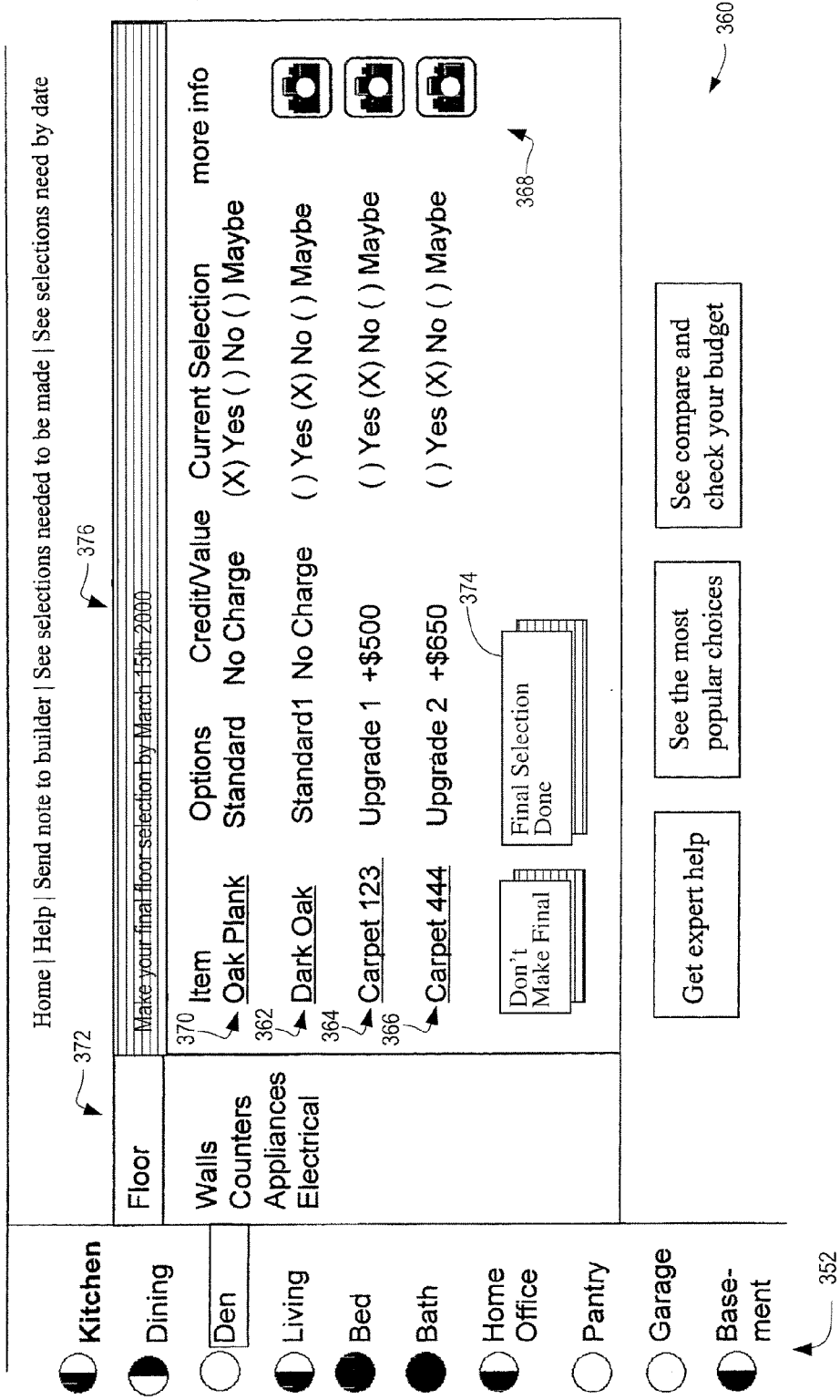
FIG. 31 depicts a selection screen that may be used by a customer of a builder using the system of FIG. 1.

For example, the customer 22, 24 may note from the status ledger 350 that the den was not complete. In response, the customer 22, 24 may select the den 354 and be taken to screen 360 of FIG. 31.

On screen 360, the den may be highlighted in the left margin 352 as a current location. Further, an indicator 372 may be provided of the feature space to which the selection is to be directed. The screen 360 may also list three options 362, 364, 366, 370. An icon of a product, or a camera 368 may be selected for a pictorial view of each option. A selection date 376 may be provided as a deadline for making a selection for the den.

If the customer should select the first option 370 for oak plank for the floor, a current selection column will show an icon or an "x" in the "yes" column. The customer 22, 24 may complete the selection by activating the "final selection done" button 374.

Returning to the status ledger 350, the customer 22, 24 may then go to the kitchen to make other selections in this feature space. The customer 22, 24 may go to the kitchen by activating the kitchen icon 354 in the left margin.

Figure 32:
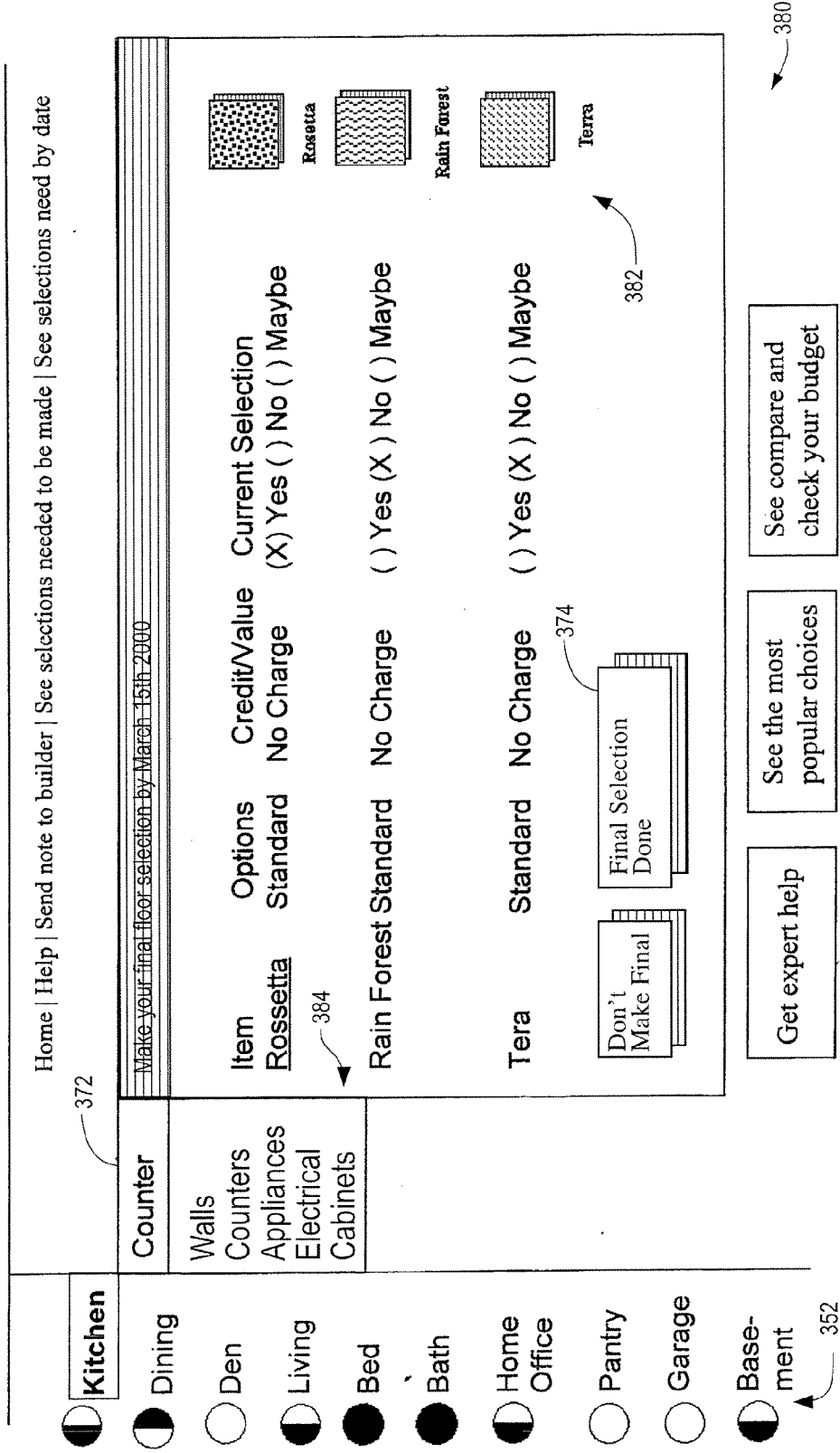

In response, the customer 22, 24 may be taken the screen 380 (FIG. 32), which shows a feature space (e.g., a counter) 372 within which a selection needs to be made. In this case, the customer 22, 24 may activate the more information button to view images 382 of the options.

Figure 33:
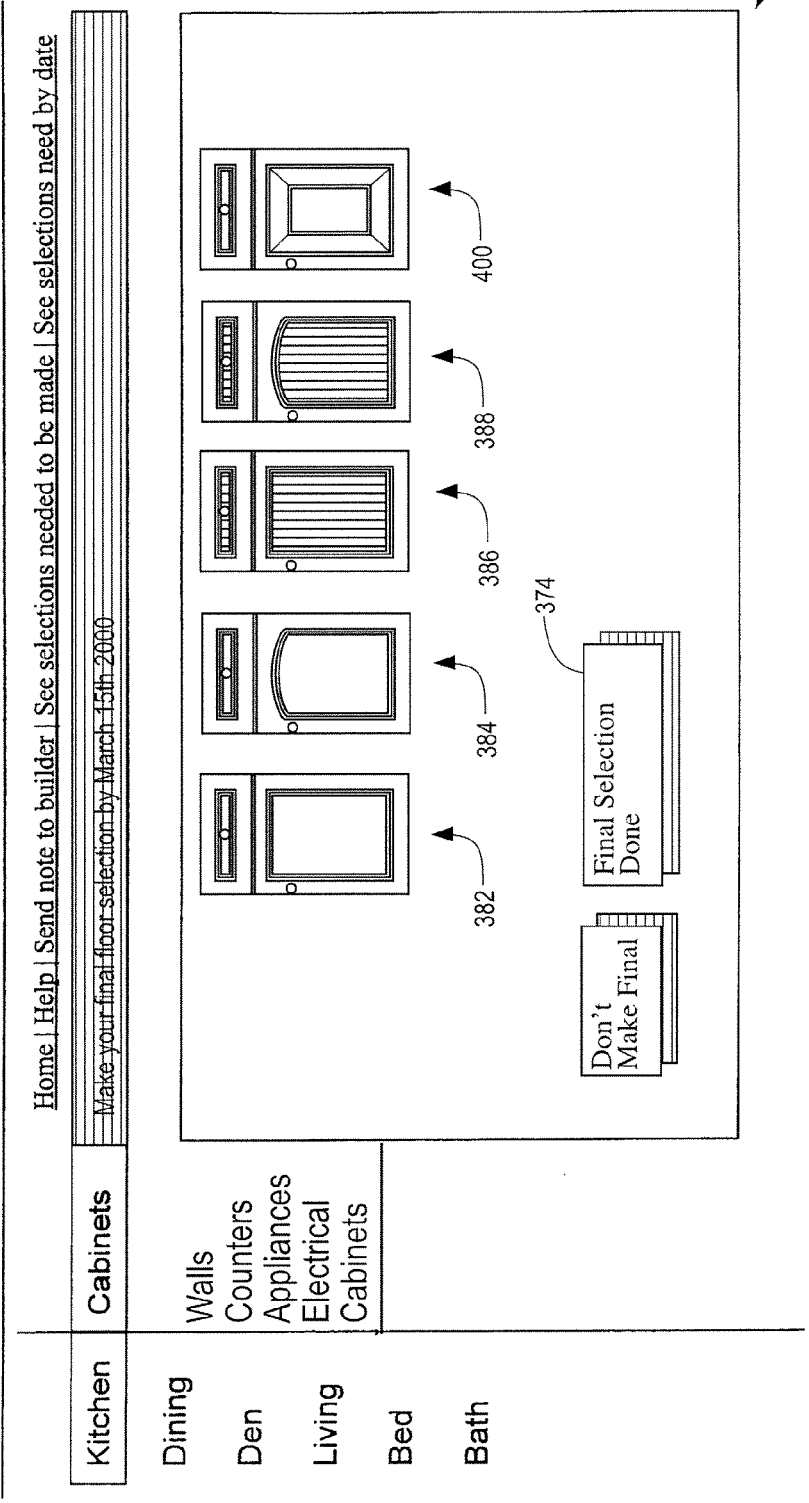

After making a selection with regard to the counters, the customer 22, 24 may select cabinets 384 for another set of options shown on screen 390 of FIG. 33. Within the cabinets screen 390 a set of images 392, 394, 396, 398, 400 may be provided of the possible cabinet choices.

Once the customer 22, 24 has completed set of selections for the kitchen, the customer 22, 24 may activate the final selection done button 374. Upon activating a final selection button 374, the customer 22, 24 may be taken to a selections summary screen 410 (FIG. 34). Shown on the selections summary screen 410 is a list of current selections as well as a list 416 of the cost of any extras added during the current selection session for the kitchen.

Upon reviewing the list 416, the customer 22, 24 may return to selecting items by activating the see selections to made button 344 or see selections by date 346. Alternatively, the customer 22, 24 may send a list of selected items to the builder 26 by activating a message button 412.

Based upon the options list the CPU 12 may compose a number of e-mails to the suppliers 27, 28 of the builder 26 for purposes of placing orders for selected product. One e-mail may be to one or more appliance suppliers 27, 28 for selected appliances. Another e-mail may be a carpet supplier 27, 28. A third e-mail may be to a paint supplier. Another e-mail may be to a mechanical supplier 27, 28 for furnaces and air conditions. Included within each of these e-mails may be a request for an updated price quote as well as a lead time for delivery.

Based upon the response to the request for lead times, the builder 26 may adopt a construction schedule based upon a requested completion date 135 (FIG. 6) included in the real estate contract. As would be generally understood, a construction schedule is typically based upon a predetermined ordering sequence (e.g., in-wall electrical would be required before walls and paint, paint would be required before most appliances). Using the predetermined schedule, completion date 135 and lead times provided by the suppliers 27, 28, the CPU 12 would create a building schedule including ordering dates for each of the materials of each of the selected options.

Based upon the entries within the construction schedule, the CPU 12 may identify options which have not been made by the customer 22, 24. Upon identifying those selections not made by the customer, the CPU 12 may notify the builder 26 and customer 22, 24, by e-mail or otherwise of dates and acts necessary to conform to the construction schedule.

As an alternative to automatically forwarding orders to suppliers, the system 10 or the builder 26 may group orders for purposes of obtaining volume discounts. In order to group orders, the builder 26 may also periodically print out the grouped orders and physically send the grouped order to a supplier 27, 28 or the system 10 may transmit the grouped orders by e-mail or fax.

Using the builder's terminal 26, the builder may periodically review the construction schedule. Based upon the review, the builder 26 or the system 10 may send messages to the customer 22, 24 reminding the customer 22, 24 of deadlines for making selections.

Figure 14:
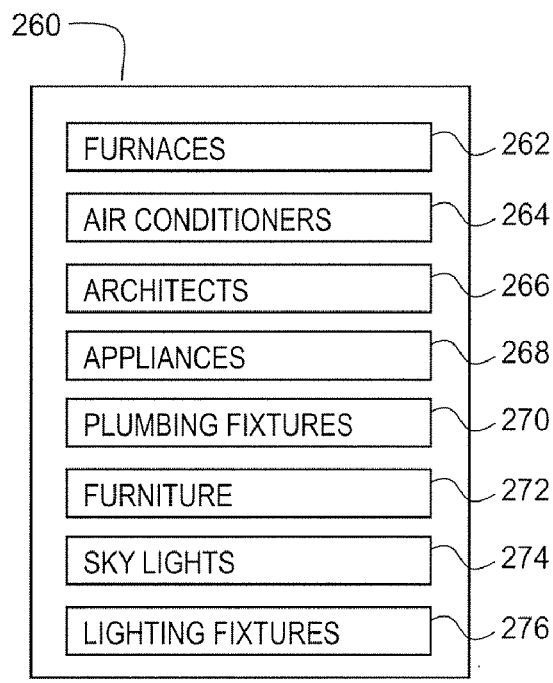
FIG. 14 depicts a showroom that may be used by customers of the system of FIG. 1.

Under another alternate illustrated embodiment, a third website 18 may be provided for a broader array of customers. In this context, a customer may be the originally defined customers 22, 24 as well as the builder 26 or suppliers 27, 28. As each customer 22, 24, 26, 27, 28 accesses the website 18, the webpage 260 may be presented to the customer (FIG. 14). Based upon the customer's needs, any of a number of subject matter may be selected for purchase based upon activation of the appropriate softkey 262, 264, 266, 268, 270, 272, 274, or 276.

Figure 15:
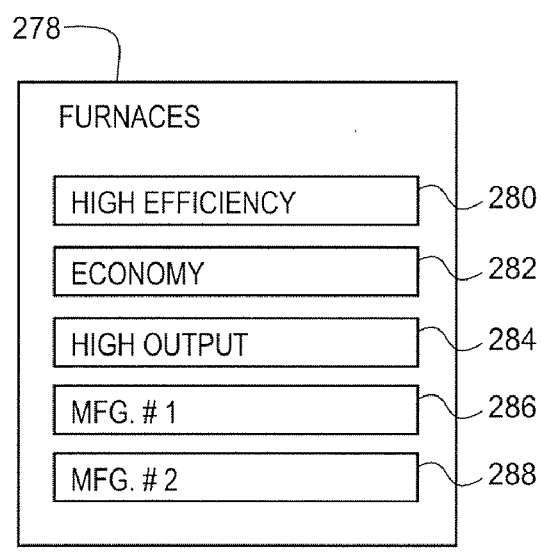
FIG. 15 depicts hyperlinks that may be used by the system of FIG. 1.

Activation of a softkey (e.g., 262) may take the customer to a furnaces webpage 278 showing a number of furnace options. (FIG. 15) Information on special types of furnaces may be obtained by selection of the appropriate softkeys 280, 282. Information from specific manufactures may also be obtained by selecting a hyperlink 286, 288 which may take the customer to a website (e.g., 38) of the manufacturer.

Upon reaching the appropriate webpage, a customer may fill his shopping cart with selected merchandise. As used herein, a "shopping cart" is simply file and information gathering and ordering software residing in a terminal of the customer 22, 24, 26, 27, 28 which retains product information of selected merchandise. Upon activation of a softkey on the shopping cart, the ordering software functions to transmit ordering information to the appropriate manufacturer or supplier.

As above, the owner of the system 12 may receive a fee or commission on any views or purchases made based upon activation of a selected hyperlink. Further, the owner of the system 12 may receive fees or commissions based upon advertising displayed on the webpages 278 of the product categories.

Under another alternate illustrated embodiment of the invention, a builder 26 and designer (e.g., supplier 27, 28) may use the builder's website 16 for designing and developing building drawings (e.g., a kitchen design). Under the embodiment, either party may propose and create a preliminary design concept using an appropriate graphics software package (e.g., Visio) and save the design in a design file. Once a design file has been created, it may be e-mailed to the other party. The other party, using the same graphics package, may mark the file up or modify the design and e-mail the file back to the other party. Once both parties agree to the design, the builder 26 may convert the graphics file to a webpage using a simple graphics conversion process (e.g., printing out the Visio design file and scanning the printout to obtain a html graphics display that may be mounted on the builder's webpage 34). The new design may then become the basis of new or additional product offerings of the builder 26.

As a further embodiment of the invention, the designer may also develop and attach specification sheets to each design drawing of the Visio file. The specification sheets may be used to specify product(s)/product offerings to be used in the product spaces of the design.

Upon converting each design drawing to a html file for display on a webpage 34, the builder 26 may also associate one or more design spaces with each design drawing. Product(s)/product offerings from the specification sheets of the drawing may then be associated with each design space and incorporated into the features and options list for the design space.

Under another illustrated embodiment of the invention, file transfer among builders, suppliers and manufactures may be standardized to a common file format (e.g., XML). Under the embodiment, the file creator follows a predetermined format for creation of the file. For example, a product identifier may be placed in a first field. The product identifier may be one or more alphanumeric characters which identifies the product as a refrigerator or a bathroom faucet. The product identifier may also be used for product offerings.

An identifier of an originator may be placed in a second field. A product number (model number and serial number, if a manufacturer) may be placed in a third field. Any graphics associated with the product may be placed in further fields.

Under the embodiment, the receiver of such an XML file may be able to universally interpret the file based upon file content. The product type identifies the types of suppliers of such products. The identifer of the originator allows the recipient to read local source files to determine the types of model number and serial numbers used by the originator, and, ultimately to interpret model and serial numbers included within the remainder of the XML file.

By using the common, or coordinated file formats, builders 26, suppliers 27, 28 and manufactures 30, 31 may exchange information without advance knowledge of the source or format of the file. Orders and order confirmations may be exchanged without the intervention of ordering clerks or project schedulers.

Figure 37:
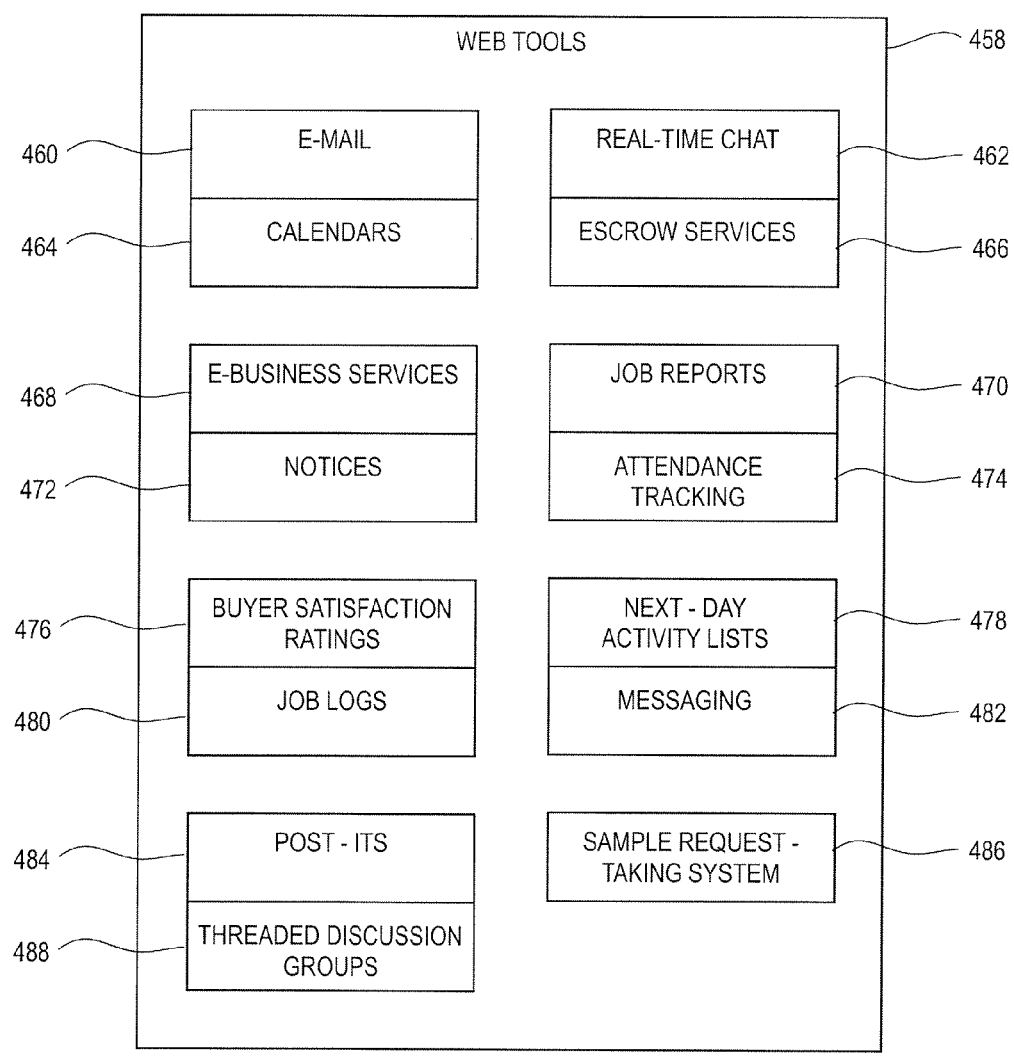
FIG. 37 depicts web tools that may be available to builders using the system of FIG. 1.

As an additional embodiment of the invention, web tools 458 (FIG. 37) may be provided to builders 26. Included among the web tools 458 offered to builders 26 are e-mail 460, real-time chat 462, calendars 464, escrow services 466, e-business services 468, job reports 470, notices 472, attendance tracking 474, buyer satisfaction ratings 476, next-day activity lists 478, job logs 480, messaging 482, post-its 484, sample request-taking systems 486, and threaded discussion groups 488.

As a further embodiment of the invention, the system 10 may include collecting up-front access, semi-custom web design, and data service fees or commissions from builders 26.

A specific embodiment of a method and apparatus for servicing a customer of a builder according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of servicing a plurality of customers or potential customers among a plurality of builders by a third-party website provider, such method comprising the steps of:

providing a first website by the third-party website provider for use by the plurality of customers or potential customers in viewing and selecting product options of product offerings available from or through the plurality of builders, an information content of at least some customers of the plurality of customers within said first website being password protected by a respective password of the at least some customers of the plurality of customers and the first website having at least one page of offerings unique to each of the plurality of builders;

a customer of the plurality of customers and a builder of the plurality of builders entering into a contract to build or rehabilitate real estate for the customer at a building site of the real estate, said contract forming a new contract or a modification or amendment of a pre-existing contract;

providing at least one form to be filled out by the customer through the first website;

providing a second website associated with the first website by the third-party website provider for entry of information related to the customer by the builder said second website being password protected by the builder;

receiving from the customer through the first website a view and selection of an option of the options provided by the builder;

incorporating the selected options, and a content of the at least one filled in form into a modification of the contract; and collecting a fee or commission based upon the products viewed by and selections made by the customer.

2. The method of servicing a customer of a builder as in claim 1 further comprising the first website offering purchase and pre-purchase information, a buyers' group service for a plurality of builders for volume discounts, advertising, and product information, and customer and sales support.

3. The method of servicing a customer of a builder as in claim 1 wherein the step of providing the first website further comprises providing an online deposit system.

4. The method of servicing a customer of a builder as in claim 3 further comprising purchasing extras using the online deposit system.

5. The method for servicing a customer of a builder as in claim 1 wherein the step of providing the first website further comprises allowing manufacturers, sub-contractors, and vendors to pre-view potential orders, groups of orders, and customer product viewings.

6. The method for servicing a customer of a builder as in claim 1 further comprising providing web and communications tools to the builder, sub-contractors, and suppliers.

7. The method for servicing a customer of a builder as in claim 6 further comprising defining the web and communication tools as at least one of the group consisting of e-mail, real-time chat, calendars, escrow services, e-business services, job reports, notices, attendance tracking, buyer satisfaction ratings, next day activity lists, job logs, messaging, post-its, sample request-taking system, and threaded discussion groups.

8. The method for servicing a customer of a builder as in claim 1 further comprising collecting up-front access, semi-custom web design, and data service fees or commissions from the builder and third-party advertisers.

9. The method for servicing a customer of a builder as in claim 1 wherein the step of providing the first website further comprises allowing manufacturers, sub-contractors, and suppliers to advertise their products through the system.

10. An apparatus for servicing a plurality of customers or potential customers among a plurality of builders by a third-party website provider, such apparatus comprising:

means for providing a first website by the third-party website provider for use by the plurality of customers in viewing and selecting product options of product offerings available from the plurality of builders, an information content of at least some customers of the plurality of customers within said first website being password protected by a respective password of the at least some customers the means for providing a first website further providing at least one page of offerings unique to each of the plurality of builders;

means for establishing the terms of a contract between a customer of the plurality of customers and a builder of the plurality of builders to build or rehabilitate real estate for the customer at a building site of the real estate, said contract forming a new contract or a modification or amendment of a pre-existing contract;

means for providing at least one form to be filled out by the customer through the first website;

means for providing a second website associated with the first website by the third-party website provider for entry of information related to the customer by the builder said second website being password protected by a password of the builder;

means for receiving from the customer through the first website a selection of an option of the options provided by the builder;

means for incorporating the selected options and content of the at least one filled in form into a modification of the contract; and means for collecting a fee or commission based upon the products viewed by and selections made by the customer.

11. The apparatus for servicing a customer of a builder as in claim 10 further comprising means for offering purchase and pre-purchase information, a buyers' group service for a plurality of builders for volume discounts, advertising, post-closing product information, and customer and sales support.

12. The apparatus for servicing a customer of a builder as in claim 10 wherein the means for providing the first website further comprises means for offering an online deposit system.

13. The apparatus for servicing a customer of a builder or plurality of builders as in claim 12 wherein the means for offering the online deposit system further comprises means for purchasing extras.

14. The apparatus for servicing a customer of a builder or plurality of builders as in claim 10 wherein the means for providing the first website further comprises means for allowing manufacturers, sub-contractors, and vendors to pre-view potential orders, groups of orders, and customer or plurality of builders product viewings.

15. The apparatus for servicing a customer of a builder or plurality of builders as in claim 10 further comprising means for providing web and communications tools to the builder, sub-contractors, and suppliers.

16. The apparatus for servicing a customer of a builder or plurality of builders as in claim 15 wherein the web and communication tools further comprise at least one of the group consisting of e-mail, real-time chat, calendars, escrow services, e-business services, job reports, notices, attendance tracking, buyer satisfaction ratings, next day activity lists, job logs, messaging, post-its, sample request-taking system, and threaded discussion groups.

17. The apparatus for servicing a customer of a builder or plurality of builders as in claim 10 further comprising means for collecting up-front access, semi-custom web design, and data service fees or commissions from the contractor.

18. The apparatus for servicing a customer of a builder or plurality of builders as in claim 10 wherein the means of providing the first website further comprises means for allowing manufacturers, sub-contractors, and suppliers to advertise their products through the system.

19. An apparatus for servicing a plurality of customers among a plurality of builders by a third-party website provider, such apparatus comprising:
- a first website provided by the third-party website provider for use by the plurality of customers in viewing and selecting product options of product offerings available from the plurality of builders, an information content of at least some customers of the plurality of customers within said first website being password protected by a respective password of the at least some customers the first website having at least one page of offerings unique to each of the plurality of builders;
- a contract term establishment processor establishing terms of a contract between a customer of the plurality of customers and a builder of the plurality of builders to build or rehabilitate real estate for the customer at a building site of the real estate, said contract forming a new contract or a modification or amendment of a pre-existing contract;
- a second website associated with the first website provided by the third-party website provider for entry of information related to the customer by the contractor said second website being password protected by a password of the contractor;
- at least one form to be filled out by the customer that are provided through the first website;
- a selection processor receiving through the first website views and selections of an option of the options provided by the builder;
- a commission processor adapted to collect a fee or commission based upon the received selection made by the customer, and/or the products viewed by the customer; and
- a contract term change processor for altering the terms of the contract based upon a content of the at least one filled in form and selected options.

20. The apparatus for servicing a customer of a builder or plurality of builders as in claim 19 wherein the first website further comprises an online deposit system.

21. The apparatus for servicing a customer of a builder or plurality of builders as in claim 20 wherein the online deposit system further comprises a credit source for the purchase of extras.

22. The apparatus for servicing a customer of a builder or plurality of builders as in claim 19 wherein the first website further comprises a system for allowing manufacturers, sub-contractors, and vendors to pre-view potential orders, groups of orders, and customer product viewings.

23. The apparatus for servicing a customer of a builder as in claim 19 further comprising web and communications tools available to the builder, sub-contractors, and suppliers.

24. The apparatus for servicing a customer of a builder or plurality of builders as in claim 23 wherein the web and communication tools further comprise at least one of the group consisting of e-mail, real-time chat, calendars, escrow services, e-business services, job reports, notices, attendance tracking, buyer satisfaction ratings, next day activity lists, job logs, messaging, post-its, sample request-taking system, and threaded discussion groups.

25. The apparatus for servicing a customer of a builder or plurality of builders as in claim 19 wherein the first website further comprises a system for allowing manufacturers, sub-contractors, and suppliers to advertise their products.

26. A method of servicing customers of a plurality of builders or a plurality of builders through a third-party website provider, such method comprising the steps of:
- the plurality of builders providing product offerings to customers through a first website provided by the third-party website provider the first website having at least one page of offerings unique to each of the plurality of builders;
- a customer of the plurality of customers and a builder of the plurality of builders entering into a contract to build or rehabilitate real estate for the customer at a building site of the real estate, said contract forming a pre-existing contract;
- the customer viewing and selecting product options of product offerings available from or through the builder through the first website;
- receiving from the customer through the first website a selection of an option of the options provided by the builder;
- incorporating the selected options, into a new or modification of the pre-existing contract; and
- the third-party website collecting a fee or commission based upon the products viewed by and selections made by the customer.

* * * * *